（12）United States Patent
Ikeno

(10) Patent No.: US 10,833,375 B2
(45) Date of Patent: Nov. 10, 2020

(54) BATTERY DEVICE, ELECTRONIC DEVICE, ELECTRONIC VEHICLE, POWER STORAGE SYSTEM, AND CONTROL METHOD

(71) Applicant: MURATA MANUFACTURING CO., LTD., Kyoto (JP)

(72) Inventor: Junpei Ikeno, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 163 days.

(21) Appl. No.: 16/178,026

(22) Filed: Nov. 1, 2018

(65) Prior Publication Data

US 2019/0089020 A1 Mar. 21, 2019

Related U.S. Application Data

(63) Continuation of application No. PCT/JP2017/021751, filed on Jun. 13, 2017.

(30) Foreign Application Priority Data

Jul. 22, 2016 (JP) .................................. 2016-144157
Apr. 18, 2017 (JP) .................................. 2017-082188

(51) Int. Cl.
*H01M 10/44* (2006.01)
*H01M 10/48* (2006.01)
*B60L 58/12* (2019.01)
*B60L 58/22* (2019.01)
*H01M 10/6571* (2014.01)

(52) U.S. Cl.
CPC ........... *H01M 10/443* (2013.01); *B60L 58/12* (2019.02); *B60L 58/22* (2019.02); *H01M 10/441* (2013.01); *H01M 10/486* (2013.01); *H01M 10/482* (2013.01); *H01M 10/6571* (2015.04)

(58) Field of Classification Search
CPC ......................................................... H02J 7/00
See application file for complete search history.

(56) References Cited

U.S. PATENT DOCUMENTS

| 9,527,390 B2 | 12/2016 | Yamazaki et al. | |
|---|---|---|---|
| 2006/0071979 A1* | 4/2006 | Ushinohama | ........ B41J 2/04573 347/56 |
| 2014/0253046 A1* | 9/2014 | Poznar | ................ H01M 10/615 320/136 |
| 2016/0105042 A1* | 4/2016 | Taylor | ................... H02J 7/0014 320/134 |

FOREIGN PATENT DOCUMENTS

| JP | 2005332777 A | 12/2005 |
|---|---|---|
| JP | 2008016229 A | 1/2008 |

(Continued)

OTHER PUBLICATIONS

Japan Patent Office, International Search Report for Application No. PCT/JP2017/021751, dated Jul. 18, 2017.

*Primary Examiner* — Robert Grant
(74) *Attorney, Agent, or Firm* — K&L Gates LLP

(57) ABSTRACT

A battery device is provided. The battery includes a temperature detector configured to detect a temperature of a battery and a controller configured to perform variable current discharge on the battery when the temperature detector detects a constant temperature range immediately before a start of charge.

15 Claims, 15 Drawing Sheets

(56) References Cited

FOREIGN PATENT DOCUMENTS

| | | | |
|---|---|---|---|
| JP | 2009054419 | A | 3/2009 |
| JP | 2013200966 | A | 10/2013 |
| JP | 2014157778 | A | 8/2014 |
| JP | 2015029366 | A | 2/2015 |
| JP | 2015047027 | A | 3/2015 |

\* cited by examiner

BATTERY DEVICE, ELECTRONIC DEVICE, ELECTRONIC VEHICLE, POWER STORAGE SYSTEM, AND CONTROL METHOD

CROSS REFERENCE TO RELATED APPLICATIONS

The present application is a continuation of PCT patent application no. PCT/JP2017/021751, filed on Jun. 13, 2017, which claims priority to Japanese patent application no. JP2016-144157 filed on Jul. 22, 2016 and Japanese patent application no. JP2017-082188 filed on Apr. 18, 2017, the entire contents of which are being incorporated herein by reference.

BACKGROUND

The present technology generally relates to a battery device, an electronic device, an electric vehicle, a power storage system, and a control method.

Uses of secondary batteries represented by lithium ion secondary batteries are widened. Depending on the use, the lithium ion secondary battery may be used at low temperature such as below freezing.

SUMMARY

The present technology generally relates to a battery device, an electronic device, an electric vehicle, a power storage system, and a control method.

It is desired that a secondary battery such as a lithium ion secondary battery whose use is widened can be charged even at low temperature.

Accordingly, an object of the present technology is to provide a battery device, an electronic device, an electric vehicle, a power storage system, and a control method that can be charged even at low temperature.

According to an embodiment of the present technology, a battery device is provided. The battery device includes a temperature detector configured to detect a temperature of a battery and a controller configured to perform variable current discharge on the battery when the temperature detector detects a constant temperature range immediately before a start of charge.

In an embodiment, the constant temperature range is, for example, from −20° C. to 0° C.

In another embodiment, the present technology may provide, for example, an electronic device that receives supply of electric power from the above-described battery device.

In another embodiment, the present technology may provide, for example, an electric vehicle including the above-described battery device.

In another embodiment, the present technology may provide, for example, a power storage system including the above-described battery device.

In another embodiment, the present technology provides, for example, a control method in which at a dischargeable and non-chargeable temperature, a controller is configured to perform a variable current discharge control to increase a discharge current value and discharge a battery as a temperature of the battery rises.

In another embodiment, the present technology provides a battery device including an assembled battery in which a plurality of secondary batteries are connected in series and/or in parallel and assembled in proximity to each other, a first balance correction circuit having a first switch configured to perform balance correction and connected to each of the secondary batteries of the assembled battery and a plurality of resistors to which a current flowing through the first switch is supplied, and a second balance correction circuit having a second switch configured to perform balance correction and connected to each of the secondary batteries of the assembled battery and a plurality of heater resistors to which a current flowing through the second switch is supplied. In this battery device, the plurality of heater resistors are arranged in contact with or near a secondary battery of the assembled battery, balance correction is performed by first balance correction circuit at a chargeable temperature, and after balance correction is performed by the second balance correction circuit at a dischargeable and non-chargeable temperature, a variable current discharge control is performed on the secondary battery.

According to at least one embodiment of the present technology, a secondary battery can be charged at low temperature. The effects described herein are non-limiting, and may be any one of effects described in the present technology. In addition, the contents of the present technology should not be interpreted as being limited by the exemplified effects and other suitable properties relating to the present technology may be realized and as further described.

DETAILED DESCRIPTION

The present technology generally relates to a battery device, an electronic device, an electric vehicle, a power storage system, and a control method. As described herein, the present disclosure will be described based on examples with reference to the drawings, but the present disclosure is not to be considered limited to the examples, and various numerical values and materials in the examples are considered by way of example.

Figure 1:
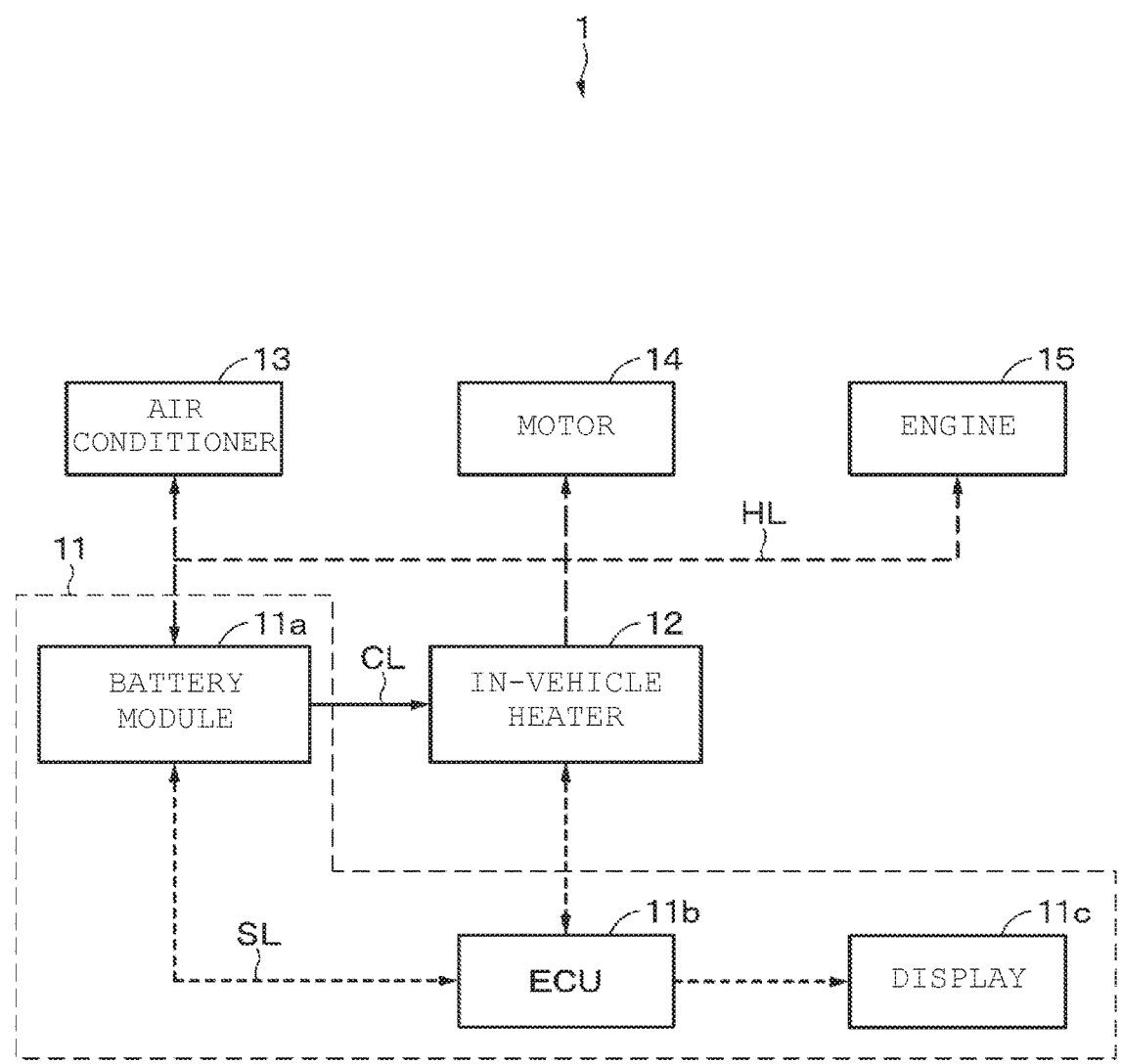
FIG. 1 is a block diagram showing a configuration example of an in-vehicle system according to an embodiment of the present technology.

FIG. 1 shows a configuration example of an in-vehicle system (in-vehicle system 1) to which a battery device according to a first embodiment of the present technology is applied. The in-vehicle system 1 has, for example, a configuration including a battery device 11, an in-vehicle heater (hereinafter appropriately abbreviated as a heater) 12, an air conditioner 13, a motor 14, and an engine 15. In FIG. 1, an example of a communication path is shown by a line denoted by reference symbol SL, an example of a path through which current flows is shown by a line denoted by reference symbol CL, and a path through which heat generated by the heater 12 is transmitted is shown by a line denoted by reference symbol HL.

The battery device 11 has a battery module 11a, an engine control unit (ECU) 11b, and a display 11c. Although the battery module 11a according to the present embodiment is described as a secondary battery housed in a hood and used for supplying electric power to electrical components and the like in a vehicle, for example, the battery module 11a may be a secondary battery of a power source in an electric vehicle. Current from the battery module 11a is supplied to the heater 12 described above. When the current is supplied, the heater generates heat, and this heat is utilized for warming up the air conditioner 13, the motor 14, and the engine 15.

The ECU 11b is constituted by a microcomputer or a processor or the like, and performs control on each unit (for example, the battery device 11) of the in-vehicle system 1.

The display unit 11c, which is an example of a notifying unit, includes a monitor such as a liquid crystal display (LCD) or an organic electro luminescence (EL), a driver for driving the monitor, and the like. An alarm display to be described later is displayed on the display 11c. The display 11c may be used as a monitor of a navigation device or the like, or may be a dedicated monitor for displaying the alarm display.

Figure 2:
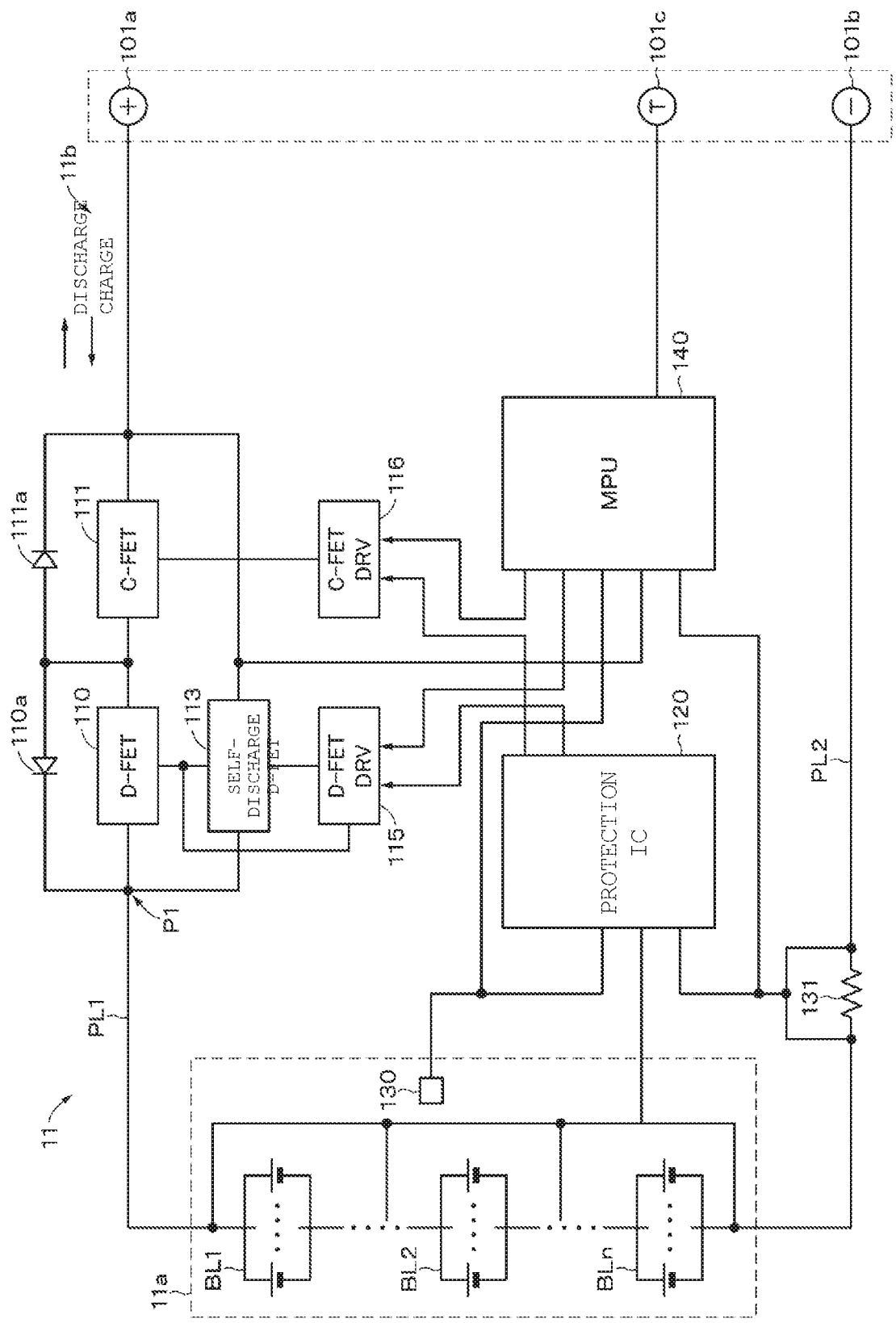
FIG. 2 is a diagram showing a configuration example of a battery device according to an embodiment of the present technology.

FIG. 2 is a diagram for describing a detailed configuration example of the battery device 11. First, an example of a secondary battery applicable to the battery module 11a according to the present embodiment will be described. An example of the secondary battery is a lithium ion secondary battery containing a positive electrode active material and a carbon material such as graphite as a negative electrode active material, and contains a positive electrode active material having an olivine structure as a positive electrode material.

A preferred positive electrode active material having an olivine structure is a lithium iron phosphate compound (LiFePO4) or a lithium iron composite phosphate compound containing an exotic atom (LiFe$_x$M$_{1-x}$O$_4$: M is one or more metals, and x is 0<x<1). When M is two or more, the Ms are selected so that a sum of numerical subscripts of the Ms becomes 1-x.

Examples of the M may include transition elements, group IIA elements, group IIIA elements, group IIIB elements, and group IVB elements. In particular, at least one of cobalt (Co), nickel (Ni), manganese (Mn), iron, aluminum, vanadium (V), and titanium (Ti) is preferably contained.

The positive electrode active material may include, on the surface of the lithium iron phosphate compound or lithium iron composite phosphate compound, a coating layer containing, for example, a metal oxide (for example, selected from Ni, Mn, Li, and the like) or phosphate compound (for example, lithium phosphate) each having a different composition from that of the lithium iron phosphate compound or lithium iron composite phosphate compound.

Examples of the positive electrode material capable of occluding and liberating lithium (Li) to be used may include lithium composite oxides such as lithium cobalt (LiCoO2), lithium nickelate (LiNiO2) and lithium manganate (LiMnO2) each having a layered rock-salt structure, and lithium manganate (LiMn2O4) having a spinel structure.

The graphite used as a negative electrode active material is not particularly limited, and graphite materials used in the industry may be widely used. Examples of the negative electrode material to be used may include lithium titanate, silicon (Si)-based materials, and tin (Sn)-based materials.

The manufacturing method of the electrode of the battery is not particularly limited, and a method used in the industry may be widely used.

The electrolytic solution used in the present technology is not particularly limited, and an electrolytic solution, which may be liquid or gel, used in the industry may be widely used.

Such a lithium ion secondary battery has, for example, a cylindrical shape. An average output of the lithium ion secondary battery (single cell) is about 3.2 V. The shape of the lithium ion secondary battery is of course not limited to a cylindrical shape, and may be any shape such as a coin shape or a square shape.

A suitable number of battery blocks BL in which single cells of the lithium ion secondary battery are connected in parallel is connected in series to form the battery module 11a. For example, when four battery blocks BL in which eight single cells are connected in parallel are connected in series, a voltage of about 12 V can be outputted from the battery module 11a.

Subsequently, a configuration example of the ECU 11b will be described. As shown in FIG. 2, a positive power line PL1 is connected to the positive electrode side of the battery module 11a, and a positive electrode terminal 101a is led out from the power line PL1. On the other hand, a negative power line PL2 is connected to the negative electrode side of the battery module 11a, and a negative electrode terminal 101b is led out from the power line PL2.

Discharge (D)-field effect transistor (FET) 110 for discharge control and charge (C)-FET 110 for charge control are connected to the power line PL1. For each FET, diodes 110a and 111a are connected in parallel. The D-FET 110 and the C-FET 111 (including the diodes 110a and 111a) may be connected to the power line PL2.

The power line PL1 is branched from a connection point P1 between the positive electrode side of the battery module 11a and the D-FET 110, and a D-FET 113 is connected between the connection point P1 in the branched power line and the positive electrode terminal 101a. The D-FET 113 is a self-discharge FET that is turned on when the battery module 11a self-discharges.

Switching control for the D-FET 110 and the D-FET 113 is performed by a D-FET driver (DRV) 115. Switching control for the C-FET 111 is performed by a C-FET driver (DRV) 116.

The ECU 11b has a protection integrated circuit (IC) 120 for protecting the battery module 11a. The protection IC 120 is connected to both ends of the battery module 11a, and monitors the voltage of the battery module 11a. Instead of or in addition to the voltage of the entire battery module 11a, the protection IC 120 may monitor the voltage of each individual battery block BL or the voltage of a single cell.

The protection IC 120 is connected to a temperature sensor 130. The temperature sensor 130 is a sensor for measuring the temperature of the battery module 11a. Temperature information measured by the temperature sensor 130 is input to the protection IC 120. The temperature sensor 130 measures the temperature of a battery in arbitrary units. In the present embodiment, the temperature sensor 130 measures the temperature in units of the battery block BL. That is, the four temperature sensors 130 are provided corresponding to the number of the battery blocks BL. The temperature sensor 130 may measure the temperature of the entire battery module 11a and the temperature of each single cell constituting the battery module 11a.

The protection IC 120 is connected to a current sensor. The current sensor is, for example, a current detection resistor (shunt resistor) 131 connected to the power line PL2. A current value detected by the current detection resistor 131 is appropriately amplified and input to the protection IC 120, The protection IC 120 performs a protection operation based on information of voltage, temperature, and current obtained by these sensors.

The ECU 11b has a micro-processing unit (MPU) 140 as an example of a control unit. The MPU 140 is connected to a communication terminal 101c. The MPU 140 communicates with an external device such as a load or an upper controller via the communication terminal 101c. For communication, for example, any communication standard such as controller area network (CAN) standard can be used. Further, the communication may be wired or wireless. The MPU 140 digitizes the voltage information, the temperature information, the current information and the like of the battery module 11a by the above-described communication and transmits the digitized information. In addition, the MPU 140 performs a variable current discharge control to be described later.

Operation of the battery device 11 will be schematically described. In a normal charge/discharge control, on/off of the D-FET 110 and the C-FET 111 is controlled, and the self-discharge D-FET 113 is turned off. Specifically, during normal discharge, the D-FET 110 is turned on, and the C-FET 111 is turned off. During charge, the D-FET 110 is turned off, and the C-FET 111 is turned on.

When the variable current discharge control to be described later is performed and the battery module 11a self-discharges, the D-FET 110 and the C-FET 111 are turned off, and the self-discharge D-FET 113 is turned on. When the D-FET 113 is turned on, a discharge path for self-discharge not passing through the D-FET 110, the C-FET 111, and so on is formed. A D-FET driver 115 and a C-FET driver 116 are operated in accordance with the control of the MPU 140 to perform switching control for these FETs.

In the present embodiment, a current value of the discharge current of the battery module 11a (hereinafter appropriately referred to as a discharge current value) can be varied. For example, the power line PL1 is connected to a variable resistor (not shown), and the resistance value of the variable resistor is varied by the MPU 140, whereby the discharge current value of the battery module 11a can be changed.

Next, protection operation performed in the battery device 11 will be schematically described. When the voltage of the battery module 11a is overdischarged, the protection IC 120 controls the D-FET driver 115 to turn off at least the D-FET 110 and the D-FET 113. As a result, the discharge is stopped. When the voltage of the battery module 11a is overcharged, the protection IC 120 controls the D-FET driver 115 and the C-FET driver 116 to turn off at least the D-FET 113 and the C-FET 111. As a result, the charge is stopped. When the temperature measured by the temperature sensor 130 reaches not less than a predetermined temperature or when the current measured by the current detection resistor 131 reaches overcurrent not less than a predetermined value, the switching control for each FET is suitably performed, so that the protection operation (circuit disconnection) is performed. Other known protection operations may be performed.

The temperature at which the lithium ion secondary battery constituting the above-described battery module 11a is chargeable is set to 0° C. or more. However, depending on use (for example, hybrid vehicle or electric vehicle) of the battery module 11a and the use area, the battery module 11a may be used at a low temperature below freezing. Thus, it is desired that the battery module 11a can be charged even under a low temperature environment of, for example, less than 0° C.

In order to satisfy such a requirement, it is conceivable to change the material of the battery or attach a dedicated heater to the battery module 11a. However, when the battery material is changed, a performance and safety confirmation test is required, and it is difficult to respond promptly to the above-described requirements. When a device such as a dedicated heater is attached to the battery module 11a, a space for the device is required, and there is also a possibility of an increase in cost.

In the technology described in the above-described Patent Document 1, although a battery module is warmed up by pulse charging and discharging, the technology cannot be applied under the charging prohibition temperature described above. In the technology described in Patent Document 2, the battery module is continuously discharged so as not to reach below the charging prohibition temperature. However, in this technology, not only reduction in the capacitance of the battery progresses due to discharge over a long period, but also once the temperature enters the charging prohibition temperature of the battery module, it becomes impossible to set a chargeable state by self heat generation. Based on the above points, an operation example of the battery device 11 will be described.

First, an operation example of the battery device 11 will be schematically described. The battery device 11 self-discharges the battery module 11a at a dischargeable and non-chargeable temperature, and raises the temperature of the battery module 11a until the temperature exceeds the chargeable temperature due to heat thereby. Then, the battery module 11a is charged. In the present embodiment, the battery module 11a is self-discharged with the heater 12 as a load.

In the present embodiment, the variable current discharge control is performed on the battery module 11a in order to efficiently warm the battery module 11a up to the chargeable temperature. The variable current discharge control is a control to switch (change) the discharge current value and discharge the battery module 11a according to the temperature of the battery module 11a. More specifically, the variable current discharge control is a control to increase the discharge current value and discharge the battery module 11a in accordance with the rise in the temperature of the battery module 11a.

When the battery module 11a is applied to the in-vehicle system 1 as in the present embodiment, it is preferable that the variable current discharge control is performed and terminated immediately before (for example, before few minutes to about 5 minutes) use of the vehicle (for example, the electric vehicle). Consequently, it is possible to prevent the battery module 11a from being discharged more than necessary. For example, it is preferable that the variable current discharge control is performed according to a predetermined operation on the vehicle. Examples of the predetermined operation on the vehicle include an operation of opening a door on the driver's seat side and a key operation for starting. The variable current discharge control may be performed when it is detected that a user having a dedicated key has approached at about several meters distance around the vehicle. The start of the variable current discharge control may be instructed remotely by a portable communication device such as a smartphone.

Figure 3:
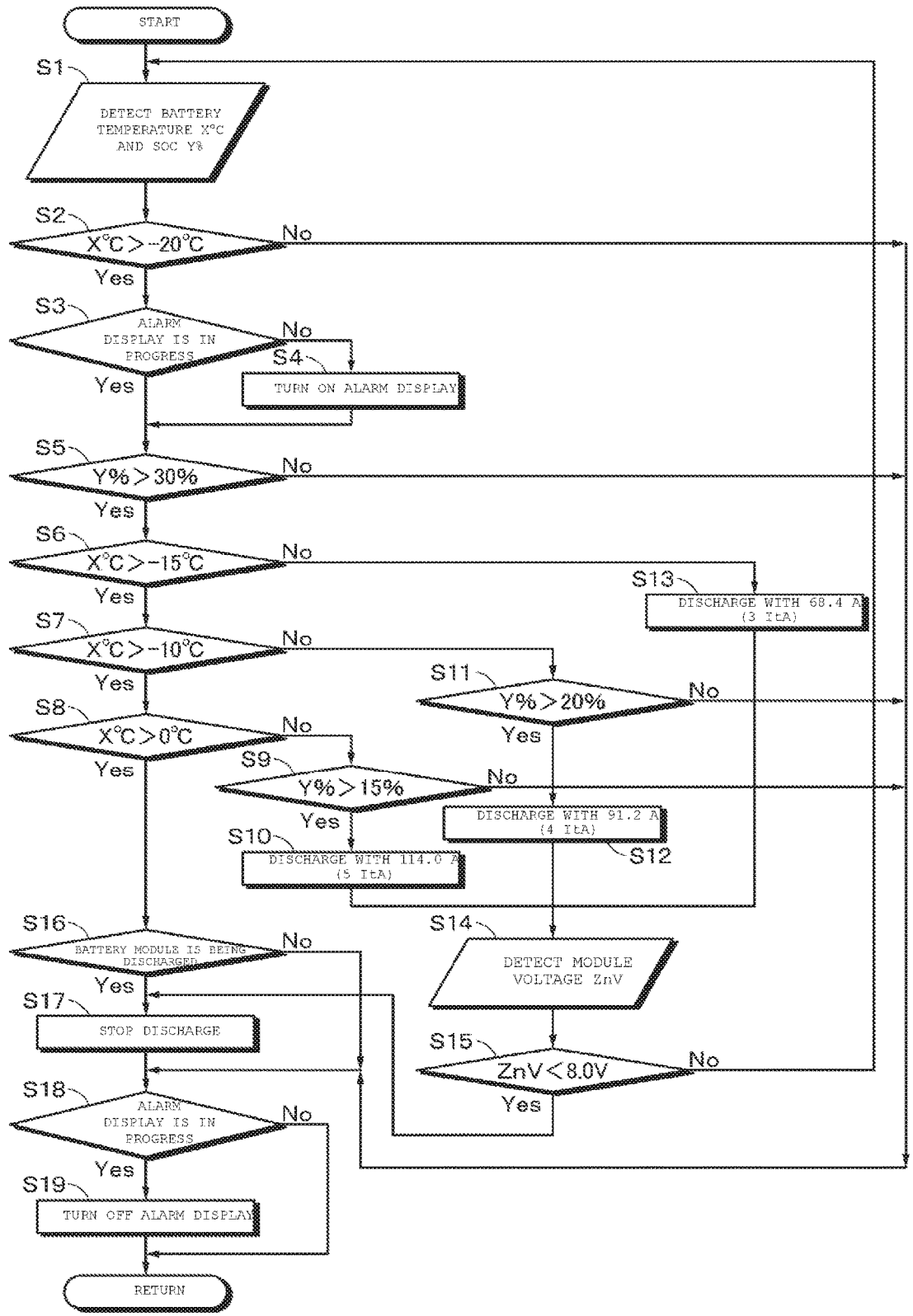
FIG. 3 is a flowchart showing an example of progression of processing in a variable current discharge control according to an embodiment of the present technology.

FIG. 3 is a flowchart for describing an example of progression of processing in the variable current discharge control performed by the MPU 140, for example. First, in step S1, the temperature (X° C.) and state of charge (SOC) (Y %) of the battery module 11a are detected. Then, the processing proceeds to step S2.

In step S2, it is judged whether the detected temperature X is higher than a discharging prohibition temperature. The temperature X to be judged here is the lowest temperature among measured temperatures. In step S2, when the detected temperature X is larger (higher) than the discharging prohibition temperature (Yes), the processing proceeds to step S3.

When the detected temperature X is higher than the discharging prohibition temperature, the battery module 11a can be self-discharged, so that the variable current discharge control is performed. In the present embodiment, a user is notified that the variable current discharge control has been started. For example, when the alarm display is displayed on the display 11c, the user is notified that the variable current discharge control has been started.

That is, in step S3, it is judged whether the alarm display is in progress. When the alarm display is not in progress, the processing proceeds to step S4, and processing for turning on the alarm display is performed. The alarm display is continuously displayed, for example, while the variable current discharge control is being performed. When it is judged in step S3 that the alarm display is in progress, processing proceeds to step S5.

When it is judged in step S2 that the temperature X is smaller (lower) than −20° C. (No), the temperature X is the discharging prohibition temperature. Therefore, the variable current discharge control is not performed, and the processing proceeds to step S18. In step S18, it is judged whether the alarm display is being displayed. In this case, the variable current discharge control is not performed, that is, the alarm display is not being displayed, so that the processing returns to step S1.

In step S5, it is judged whether the SOC of the battery module 11a is larger than a predetermined value. The predetermined value is a value set based on a battery capacitance necessary to reach the chargeable temperature (for example, 0° C.) in discharging by the variable current discharge control, and is set to 30% in the present embodiment, for example. The value of the SOC can be set to a different value depending on the type, composition, and so on of the battery module 11a. When it is judged in step S5 that the SOC is smaller than 30% (No), it is judged that even if the battery module 11a is discharged, the chargeable temperature cannot be reached, and the processing proceeds to step S18.

In step S18, it is judged whether the alarm display is being displayed. In this case, since the alarm display is being displayed, the processing proceeds to step S19. In step S19, after the alarm display is turned off, the processing returns to step S1.

When it is judged in step S5 that the SOC is larger than 30% (Yes), the processing proceeds to step S6. In the following processing, the battery module 11a is self-discharged with different discharge current values according to the temperature of the battery module 11a. In step S6, it is judged whether the temperature X of the battery module 11a is higher than −15° C. When it is judged in step S6 that the temperature X of the battery module 11a is lower than −15° C. (No), the processing proceeds to step S13.

In step S13, the discharge current value of the battery module 11a is set to 68.4 A (3 ItA) by the MPU 140, and the battery module 11a is self-discharged with the discharge current value. The discharge time in the self-discharge is suitably set according to the type of the secondary battery, the discharge current value, and the like, and is about 0.5 minutes to 2 minutes, for example. Then, the processing proceeds to step S14.

In step S14, a voltage ZnV of the battery module 11a being discharged is detected. After the voltage ZnV of the battery module 11a is detected, the processing proceeds to step S15. Since a voltage drop is large in low-temperature discharge, in step S15, it is confirmed whether the voltage ZnV of the battery module 11a is smaller than a discharge end voltage. The discharge end voltage is set to 8.0 V for example.

When it is judged in step S15 that the voltage ZnV of the battery module 11a is larger than 8.0 V (No), the processing returns to step S1 while discharge continues. When it is judged in step S15 that the voltage ZnV of the battery module 11a is smaller than 8.0 V (Yes), the processing proceeds to step S17.

In step S17, since the voltage ZnV of the battery module 11a falls below the discharge end voltage (for example, less than 8.0 V), processing for stopping the discharge is performed. Then, the processing proceeds to step S18. In step S18, it is judged whether the alarm display is being displayed. In this case, since the alarm display is being displayed, the processing proceeds to step S19. In step S19, after the alarm display is turned off, the processing returns to step S1.

When it is judged in step S6 that the temperature X of the battery module 11a is higher than −15° C. (Yes), the processing proceeds to step S7. In step S7, it is judged whether the temperature X of the battery module 11a is higher than −10° C. When it is judged in step S7 that the temperature X of the battery module 11a is lower than −10° C. (No), the processing proceeds to step S11.

In step S11, it is judged whether the SOC of the battery module 11a is larger than a predetermined value. Similar the predetermined value in the determination of step S5, the predetermined value in this case is a value set based on the battery capacitance necessary to reach the chargeable temperature in discharging by the variable current discharge control, and is set to 20%, for example. The value of the SOC can be set to a different value depending on the type, composition, and the like of the battery module 11a. When it is judged in step S11 that the SOC is smaller than 20% (No), it is judged that even if the battery module 11a is discharged, the chargeable temperature cannot be reached, and the processing proceeds to step S18.

In step S18, it is judged whether the alarm display is being displayed. In this case, since the alarm display is being displayed, the processing proceeds to step S19. In step S19, after the alarm display is turned off, the processing returns to step S1.

When it is judged in step S11 that the SOC is larger than 20% (Yes), the processing proceeds to step S12. In step S12, the discharge current value of the battery module 11a is set to 91.2 A (4 ItA) by the MPU 140, and the battery module 11a is self-discharged with the discharge current value. Then, the processing proceeds to step S14.

In step S14, a voltage ZnV of the battery module 11a being discharged is detected. After the voltage ZnV of the battery module 11a is detected, the processing proceeds to step S15. Since a voltage drop is large in low-temperature discharge, in step S15, it is confirmed whether the voltage ZnV of the battery module 11a is smaller than a discharge end voltage.

When it is judged in step S15 that the voltage ZnV of the battery module 11a is larger than 8.0 V (No), the processing returns to step S1 while discharge continues. When it is judged in step S15 that the voltage ZnV of the battery module 11a is smaller than 8.0 V (Yes), the processing proceeds to step S17.

In step S17, since the voltage ZnV of the battery module 11a falls below the discharge end voltage, processing for stopping the discharge is performed. Then, the processing proceeds to step S18. In step S18, it is judged whether the alarm display is being displayed. In this case, since the alarm display is being displayed, the processing proceeds to step S19. In step S19, after the alarm display is turned off, the processing returns to step S1.

When it is judged in step S7 that the temperature X of the battery module 11a is higher than −10° C. (Yes), the processing proceeds to step S8. In step S8, it is judged whether the temperature X of the battery module 11a is higher than 0° C. When it is judged in step S8 that the temperature X of the battery module 11a is lower than 0° C. (No), the processing proceeds to step S9.

In step S9, it is judged whether the SOC of the battery module 11a is larger than a predetermined value. Similar to the predetermined value in the determination of steps S5 and S11, the predetermined value in this case is a value set based on the battery capacitance necessary to reach the chargeable temperature in discharging by the variable current discharge control, and is set to 15%, for example. The value of the SOC can be set to a different value depending on the type, composition, and the like of the battery module 11a. When it is judged in step S9 that the SOC is smaller than 15% (No), it is judged that even if the battery module 11a is discharged, the chargeable temperature cannot be reached, and the processing proceeds to step S18.

In step S18, it is judged whether the alarm display is being displayed. In this case, since the alarm display is being displayed, the processing proceeds to step S19. In step S19, after the alarm display is turned off, the processing returns to step S1.

When it is judged in step S9 that the SOC is larger than 15% (Yes), the processing proceeds to step S10. In step S10, the discharge current value of the battery module 11a is set to 114.0 A (5 ItA) by the MPU 140, and the battery module 11a is self-discharged with the discharge current value. Then, the processing proceeds to step S14.

In step S14, a voltage ZnV of the battery module 11a being discharged is detected. After the voltage ZnV of the battery module 11a is detected, the processing proceeds to step S15. Since a voltage drop is large in low-temperature discharge, in step S15, it is confirmed whether the voltage ZnV of the battery module 11a is smaller than a discharge end voltage.

When it is judged in step S15 that the voltage ZnV of the battery module 11a is larger than 8.0 V (No), the processing returns to step S1 while discharge continues. When it is judged in step S15 that the voltage ZnV of the battery module 11a is smaller than 8.0 V (Yes), the processing proceeds to step S17.

In step S17, since the voltage ZnV of the battery module 11a falls below the discharge end voltage, processing for stopping the discharge is performed. Then, the processing proceeds to step S18. In step S18, it is judged whether the alarm display is being displayed. In this case, since the alarm display is being displayed, the processing proceeds to step S19. In step S19, after the alarm display is turned off, the processing returns to step S1.

When it is judged in step S8 that the temperature X of the battery module 11a is higher than 0° C. (Yes), it is judged that the temperature of the battery module 11a has exceeded the chargeable temperature, and the processing proceeds to step S16.

In step S16, it is judged whether the battery module 11a is being discharged. When it is judged in step S16 that the battery module 11a is being discharged, the processing proceeds to step S17. In step S17, processing for stopping the discharge of the battery module 11a is performed. When it is judged in step S16 that the battery module 11a is not being discharged, or when the discharge is stopped in step S17, the processing proceeds to step S18.

In step S18, it is judged whether the alarm display is being displayed. In this case, since the alarm display is being displayed, the processing proceeds to step S19. In step S19, after the alarm display is turned off as the variable current discharge control terminates, the processing returns to step S1. The variable current discharge control is performed as described above.

After reaching the chargeable temperature, the battery module 11a is charged at an appropriate timing. For example, the battery module 11a is charged by regenerative charge accompanying running of a vehicle. The battery module 11a may be charged by a charge device for maintenance or the like.

Figure 4:
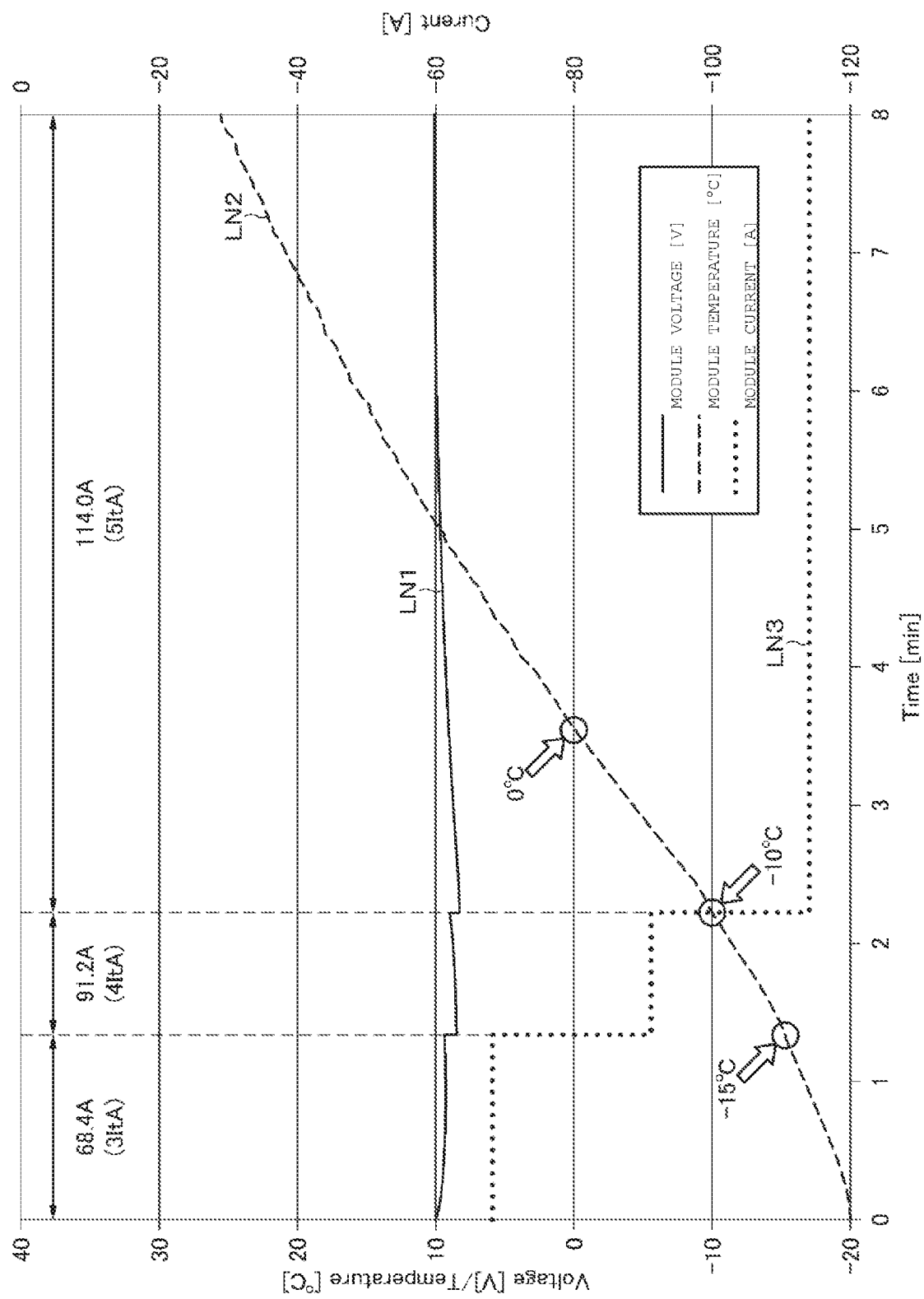
FIG. 4 is a graph for describing an example of the variable current discharge control according to an embodiment of the present technology.

FIG. 4 is a graph summarizing an example of the variable current discharge control described above. In FIG. 4 the horizontal axis represents time (minutes), and the vertical axis represents the voltage of the battery module 11a, the temperature of the battery module 11a, and the discharge current value. The voltage of the battery module 11a is indicated by a solid line LN1 in FIG. 4, the temperature of the battery module 11a is indicated by a dotted line LN2, and the discharge current value of the battery module 11a is indicated by a dotted line LN3.

The variable current discharge control is performed at a dischargeable and non-chargeable temperature (for example, −20° C.<X<0° C.).

For example, in a range of −20° C.<X<−15° C., the discharge current value is set to 68.4 A (3 ItA), and the battery module 11a is discharged.

In a range of −15° C.≤X<−10° C., the discharge current value is set to 91.2 A (4 ItA), and the battery module 11a is discharged.

In a range of −10° C.≤X<0° C., the discharge current value is set to 114.0 A (5 ItA), and the battery module 11a is discharged.

In FIG. 4, since the axis representing the discharge current value is represented by a minus sign due to discharge, in terms of absolute value, the discharge current value increases as the temperature rises.

The discharge current value is switched stepwise, for example. At the time of the switching, as indicated by the line LN1, after the voltage of the battery module 11a drops, the voltage tends to rise slightly as the temperature of the battery module 11a rises. Thus, at the timing when the discharge current value is switched, it is judged whether the voltage of the battery module 11a falls below the discharge end voltage, and it is preferable that whether to continue the discharge of the battery module 11a is judged based on the judgement result. In FIG. 4, although the discharge continues even when the temperature of the battery module 11a reaches 0° C. as the chargeable temperature, this is to observe a change in a temperature gradient thereafter, and the discharge is stopped after the temperature of the battery module 11a reaches the chargeable temperature.

When an initial temperature of the battery module 11a is in the range of −10° C.≤X<0° C., the battery module 11a may be self-discharged with a constant current, or the variable current discharge control may be performed in the above-described temperature range with a plurality of newly set discharge current values.

According to the first embodiment described above, the battery module is self-discharged under the dischargeable and non-chargeable temperature to warm up the battery module and thus to be able to attain a chargeable state. There is no need to change the material of the battery, and there is no need to provide a dedicated heater or the like. Further, it is possible to warm up the battery module efficiently in a short time by the variable current discharge control. Further, by using a heater (heating element) as a load of the battery module, it is possible to warm up the battery module more quickly and efficiently with heat generated by the heater. Furthermore, since the battery module is warmed up by heat generated by the self-discharge of the battery module, not only the surface of the battery module but also the inside can be surely warmed up.

Next, examples will be described, but the present technology is not limited to the following examples.

For the specifications of the battery module, four battery blocks in which eight single cells were connected in parallel were connected in series, and an in-vehicle 12 V battery with a nominal voltage of 12.8 V and a nominal capacitance of 22.8 ampere hour (Ah) was used. The test environment temperature is −20° C.

With respect to the following items, the evaluations were performed as to when the battery module was discharged at a constant current and when the battery module was subjected to variable discharge.

Time to reach from −20° C. to 0° C.
Discharge capacitance:
Consumed SOC

The results are shown in Table 1 below.

TABLE 1

| | Reference Example 1 | Reference Example 2 | Example 1 | Example 2 | Reference Example 3 |
|---|---|---|---|---|---|
| | | Actual measurement | | | Estimate |
| | Constant current discharge | | Variable current discharge | | |
| Conditions | 45.6 A(2 ItA) | 68.4 A(3 ItA) | 45.6 A(2 ItA) →68.4 A(3 ItA) →91.2 A(4 ItA) | 68.4 A(3 ItA) →91.2 A(4 ItA) →114.0 A(5 ItA) | 68.4 A(3 ItA) →91.2 A(4 ItA) →114.0 A(5 ItA) →132.8 A(6 ItA) |
| −20° C. → 0° C. time [sec] | 636 | 340 | 338 | 214 | 203 |
| Discharge capacitance [Ah] | 8.06 | 6.45 | 6.25 | 5.4 | 5.2 |
| Consumed SOC [%] | 34.5 | 27.4 | 26.4 | 22.8 | 21.9 |

Reference Example 1 in Table 1 shows the results when the discharge current value was set to 45.6 A (2 ItA) and the battery module was discharged at a constant current. Reference Example 2 in Table 1 shows the results when the discharge current value was set to 68.4 A (3 ItA) and the battery module was discharged at a constant current. Example 1 shows the results when the discharge current value was increased to 45.6 A (2 ItA)→68.4 A (3 ItA)→91.2 A (4 ItA) as the temperature of the battery module rose. Example 2 shows the results when the discharge current value was increased to 68.4 A (3 ItA)→91.2 A (4 ItA)→114.0 A (5 ItA) as the temperature of the battery module rose. Reference Example 3 shows the results of trial calculation based on the results of Examples 1 and 2 when the discharge current value was increased to 68.4 A (3 ItA)→91.2 A (4 ItA)→114.0 A (5 ItA)→132.8 A (6 ItA) as the temperature of the battery module rose.

The results shown in Table 1 show that in the variable current discharge, the battery module was able to be warmed up to the chargeable temperature in a shorter time with a smaller discharge capacitance than the constant current discharge. On the other hand, if the number of steps is increased from Reference Example 3 and the variable current discharge is performed at short intervals, it is considered that the battery module can be warmed up in a further shorter time with a smaller discharge capacitance. If the battery module is warmed up according to Reference Example 3, it is considered that the discharge time is reduced by 11 seconds, the discharge capacitance is −0.2 Ah, and the consumed SOC is −0.8%, as compared with Example 2. However, if the number of steps is increased to five or more, it is necessary to check the maximum discharge current of the battery in each temperature range. However, even if the temperature is finely set, since the temperature range of an actual battery is often set by 5° C., it is preferable to switch the discharge current value in four steps: −20° C. to −15° C., −15° C. to −10° C., −10° C. to −5° C., and −5° C. to 0° C.

When the discharge current is large and the number of the switching steps is small, there is a possibility that the voltage of the battery module reaches the discharge end voltage (for example, 8.0 V) due to voltage drop. Although not listed in Table 1, when the test was conducted with variable discharge in three steps: 91.2 A→114.0 A→132.8 A, the voltage drop was too large so that the voltage of the battery module reached discharge end. Accordingly, in view of the temperature range and voltage drop of the battery, it is preferable to perform the variable current discharge control in four steps within a range of about 60.0 A to 140.0 A (within a range of 3 ItA to 6 ItA), and specifically, it is preferable to perform the variable current discharge control in the four steps: 68.4 A (3 ItA)→91.2 A (4 ItA)→114.0 A (5 ItA)→132.8 A (6 ItA).

Next, a second embodiment will be described. Unless otherwise stated, the matter described in the first embodiment can be applied to the second embodiment. In the second embodiment, the configuration of the battery device is different from the configuration of the battery device according to the first embodiment.

Figure 5:
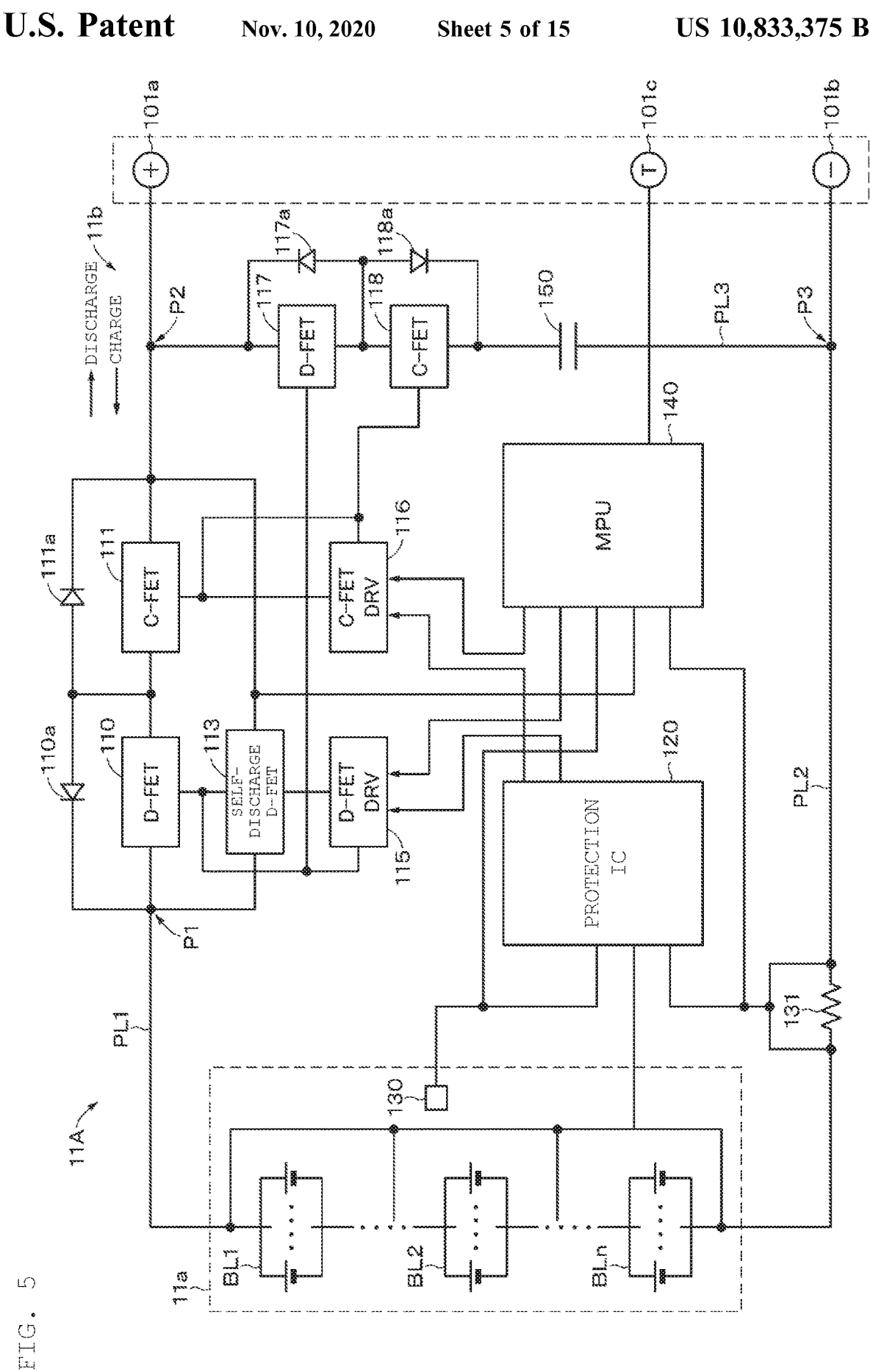
FIG. 5 is a diagram showing a configuration example of a battery device according to an embodiment of the present technology.

FIG. 5 is a block diagram showing a configuration example of the battery device (battery device 11A) according to the second embodiment. In the battery device 11A, a power line PL3 is connected between a connection point P2 of a power line PL1 and a connection point P3 of a power line PL2. The connection point P2 is, for example, a connection point between a C-FET 111 and a positive electrode terminal 101a, and is a connection point located on a self-discharge path of the battery module 11a. The connection point P3 is a connection point between a current detection resistor 131 and a negative electrode terminal 101b.

For example, a D-FET 117, a C-FET 118, and an electric double layer capacitor 150 as an example of a power storage are connected in series to the power line PL3 from the connection point P2 side. Diodes 117a and 118a are connected in parallel to the D-FET 117 and the C-FET 118, respectively. The D-FET 117 is connected to a D-FET driver 115. The C-FET 118 is connected to a C-FET driver 116.

The electric double layer capacitor 150 is an element that stores electric power outputted by self-discharge of the battery module 11a. Although the electric double layer capacitor is used in the present embodiment, an element such as a secondary battery, a lithium ion capacitor, a polyacene organic semiconductor capacitor, a nano-gate capacitor, a ceramic capacitor, a film capacitor, an aluminum electrolytic capacitor, or a tantalum capacitor, or a combination of these elements may be used as the power storage.

Next, an operation example of the battery device 11A according to the second embodiment will be described. Variable current discharge control is performed in the battery device 11A in the same manner as in the first embodiment. When the variable current discharge control is performed, an MPU 140 controls the D-FET driver 115 and the C-FET driver 116 to turn on the D-FET 117 and turns off the C-FET 118. Consequently, the variable current discharge control is performed to supply the electric power outputted from the battery module 11a to the electric double layer capacitor 150, and the electric power can be stored in the electric double layer capacitor 150.

After the variable current discharge control is terminated, the battery module 11a may be charged with the electric power stored in the electric double layer capacitor 150. For example, after the variable current discharge control is terminated, the MPU 140 controls the D-FET driver 115 and the C-FET driver 116 to turn off the D-FETs 110, 113, and 117 and turn on the C-FETs 111 and 118. Consequently, the electric power stored in the electric double layer capacitor 150 is supplied to the battery module 11a, and the battery module 11a is charged.

According to the second embodiment described above, it is possible to store electric power due to self-discharge of the battery module. In addition, the capacitance of the battery module reduced by self-discharge can be restored by charging the battery module with the stored electric power.

A combination of the first and second embodiments may be adopted. For example, a switch SW1 is provided between the connection point P2 and the positive electrode terminal 101a in FIG. 5, and a switch SW2 is provided between the connection point P2 and the D-FET 117. When the remaining capacitance of the battery module 11a is enough, while the above-described control is performed on each FET, the switch SW1 is turned on, and the switch SW2 is turned off, so that the electric power may be supplied to a load (for example, the heater 12). When the remaining capacitance of the battery module 11a is not enough, while the above-described control is performed on each FET, the switch SW1 is turned off and the switch SW2 is turned on so that the electric power is supplied to the electric double layer capacitor 150, and the battery module 11a may be charged after the variable current discharge control.

Next, a third embodiment will be described. Unless otherwise stated, the matter described in the first and second embodiments can be applied to the third embodiment. In the first and second embodiments, from the charge prohibition state at low temperature, the discharge current of the battery module is controlled to promote a temperature rise of the battery module itself by self-heating in the battery module, so that the chargeable temperature is reached efficiently.

However, although the discharge current is controlled such that the chargeable temperature is reached as soon as possible, in the case of a large battery module, the volume of the battery module is large, and even if the battery module is warmed by self-heating of the battery module, a temperature difference occurs in the battery module, so that an outer cell is less prone to being warmed. Thus, even when the temperature of the inside of the battery module reaches the chargeable temperature, the temperature of the outside of the battery module may not reach the charging chargeable temperature. In the large battery module, since the number of series is large, there is a problem that each cell voltage varies.

Thus, the third embodiment solves the following problem peculiar large battery modules.
1. The outer cell is less prone to being warmed even if the battery module self-heats.
2. Each cell voltage varies.

In the third embodiment, in order to shorten the reaching time at which the outside of the battery module reaches not less than the chargeable temperature (0° C.) beyond the charging prohibition temperature, wasteful heat loss occurring in cell balance correction and the discharge capacitance are utilized, and a cell which is less prone to being warmed and is likely to be cooled is warmed up earlier by a heater (cell balance correction resistor), thereby shortening the discharge time of the entire battery module.

Figure 6:
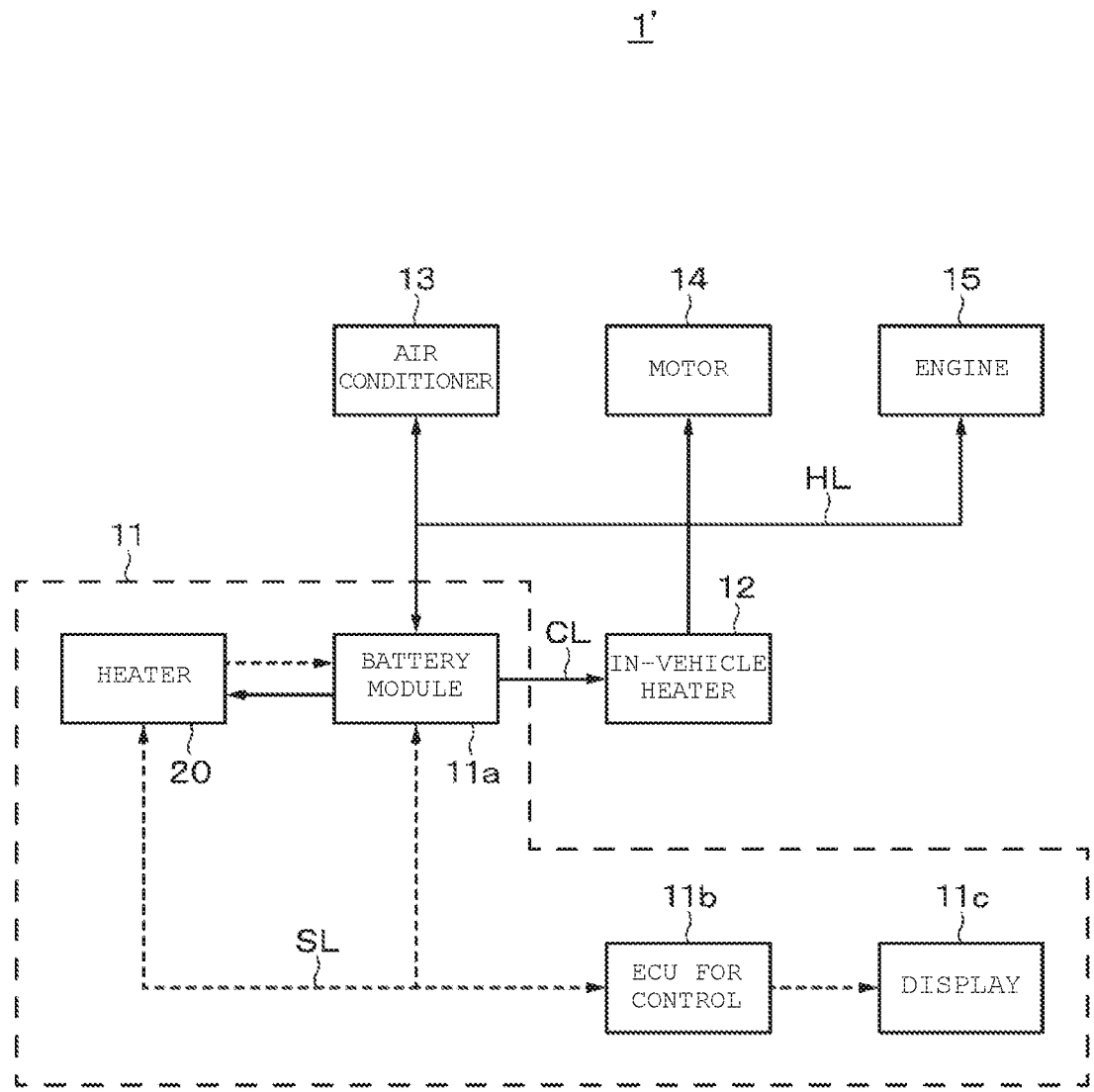
FIG. 6 is a block diagram showing a configuration example of an in-vehicle system according to an embodiment of the present technology.

FIG. 6 shows a configuration example of an in-vehicle system (in-vehicle system 1') to which a battery device according to the third embodiment of the present technology is applied. As in the in-vehicle system 1 of the first embodiment, the in-vehicle system 1' has a configuration including a battery device 11, an in-vehicle heater 12, an air conditioner 13, a motor 14, and an engine 15. Further, a heater 20 for the battery module 11a is provided. The heater 20 is controlled by an ECU 11b. The battery module 11a is a battery module (for example, a 12 V battery) in which the chargeable temperature is desired to be reached from the charge prohibition state.

In the third embodiment, as in the first and second embodiments, the cell balance is corrected before the control (variable current discharge control) where discharge is performed by the battery module 11a and the battery module 11a is warmed up by self-heating, so that the cell that is less prone to being warmed is warmed up earlier by the heater 20 (cell balance correction resistor). When all the cell balance corrections of the battery module 11a are terminated, the battery module 11a is controlled to be discharged using the in-vehicle heater 12. The control is performed by the ECU 11b. Heat generated in the in-vehicle heater 12 is used for warming up the air conditioner 13, the motor 14, and the engine 15. Although self-heating of the battery module 11a generated by the discharge is the main cause of raising the temperature of the battery module, the battery module 11a is heated also by the in-vehicle heater 12 to promote warming up of the battery module 11a. The heater 20 is provided for a cell, which is less prone to being warmed and is likely to be cooled, among a plurality of cells included in the battery module 11a and generates heat by current generated by the cell balance correction.

Figure 7:
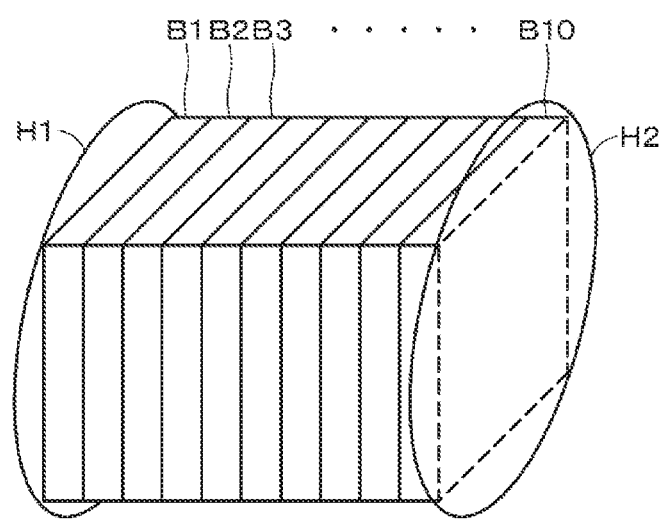
FIG. 7 is a diagram for describing an example of cells that are less prone to being warmed and warming of the cells according to an embodiment of the present technology.

A specific example of the cell which is less prone to being warmed and is likely to be cooled will be described. FIG. 7 shows a battery module in which ten cells B1 to B10 having rectangular parallelepiped shapes are connected laterally. In the configuration of FIG. 7, since the outermost cells B1 and B10 of the module are in contact with air, heat is more likely to be dissipated therefrom compared to the center cell, and even if the cells are warmed up by self-heating, the cells are less prone to being warmed than the center cell of the module. Thus, the heater 20 is attached to the cells B1 and B10, and the cells B1 and B10 are warmed up efficiently. Depending on the outer shape of the cell, thin sheet-shaped heaters H1 and H2 (schematically shown) such as a sheet heater or a ribbon heater used on a vehicle are attached directly to the cell. The reasons are "ease of attachment" and "heat transfer efficiency between the heater and the cell". Since heat is not transferred efficiently when the heater and the cell are separated from each other, it is considered that the heat transfer efficiency is the highest when the heater is applied directly onto the cell.

Figure 8:
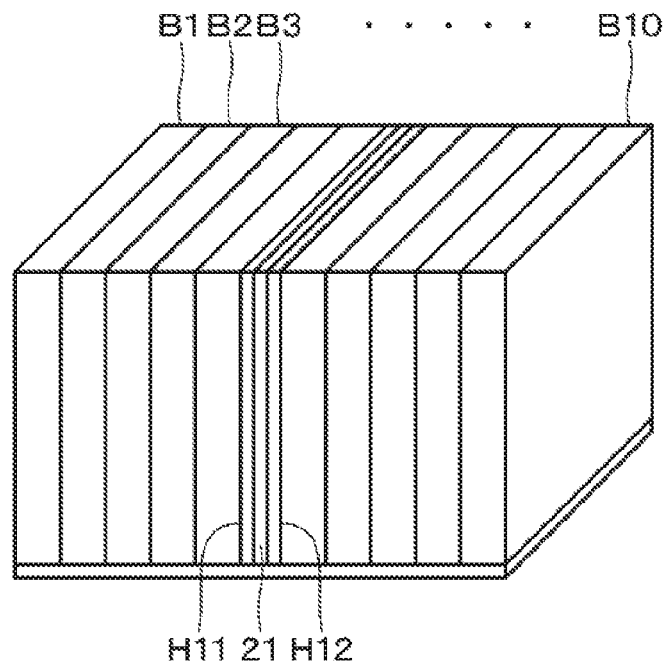
FIG. 8 is a diagram for describing another example of cells that are less prone to being warmed and warming of the cells according to an embodiment of the present technology.

As shown in FIG. 8, when a heat sink 21 is installed at the center position in the configuration in which the cells B1 to B10 are connected, although depending on the cooling effect of the heat sink 21, the center is less prone to being warmed than the outside. In that case, the heaters H11 and H12 are attached to the surface of each of the two cells in contact with the heat sink 21 or a terrace (side surface) of the cell, and the cells are warmed up. In FIG. 8, although the heat sink 21 is installed at the center, the place of installation of the heat sink 21 differs depending on the structure of the battery module, mounted equipment, and the like.

Figure 9:
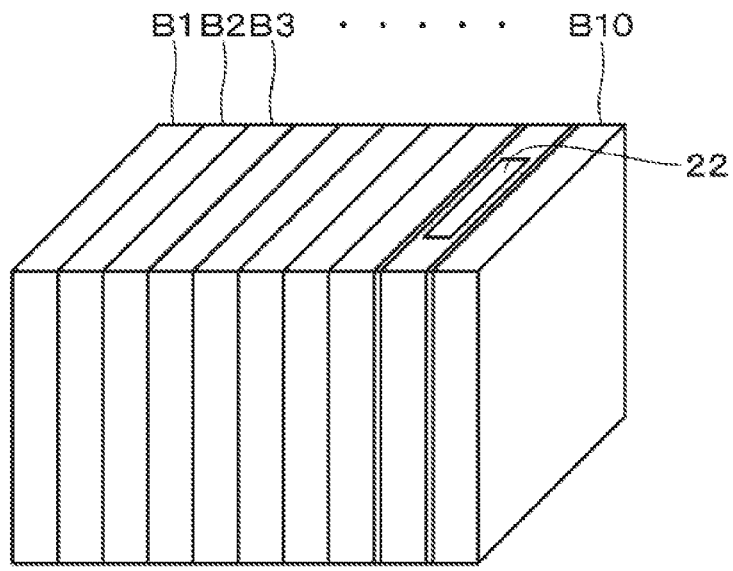
FIG. 9 is a diagram for describing still another example of cells that are less prone to being warmed and warming of the cells according to an embodiment of the present technology.

As shown in FIG. 9, there is also a configuration in which a mounting board 22 is installed at the center position. During charge and discharge, when heat generation of the mounting board 22 is small, there is a possibility that the mounting board 22 becomes a cooling member. In that case, since the cell in contact with the mounting board 22 is a cell that is less prone to being warmed, a heater is attached to the cell in contact with the mounting board 22.

Figure 10:
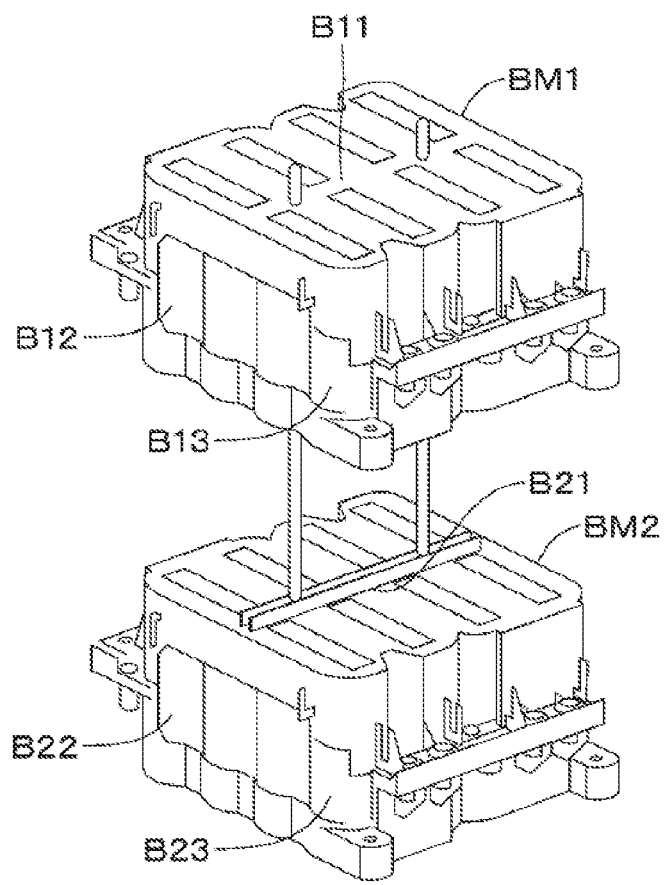
FIG. 10 is a diagram for describing yet another example of cells that are less prone to being warmed and warming of the cells according to an embodiment of the present technology.

As shown in FIG. 10, there is also a battery module configured to overlap an upper battery module BM1 and a lower battery module BM2. Each battery module is held by a holder such that cylindrical cells arranged in (4×4). For example, this battery module constitutes an in-vehicle 12 V battery module having eight cells connected in parallel and four cells connected in series in total of the upper battery module BM1 and the lower battery module BM2 and having a nominal voltage of 12.8 V and a nominal capacitance of 22.8 Ah. In this configuration, the results confirmed by experiment to determine whether a plurality of cells are less prone to being warmed will be described.

Figure 11:
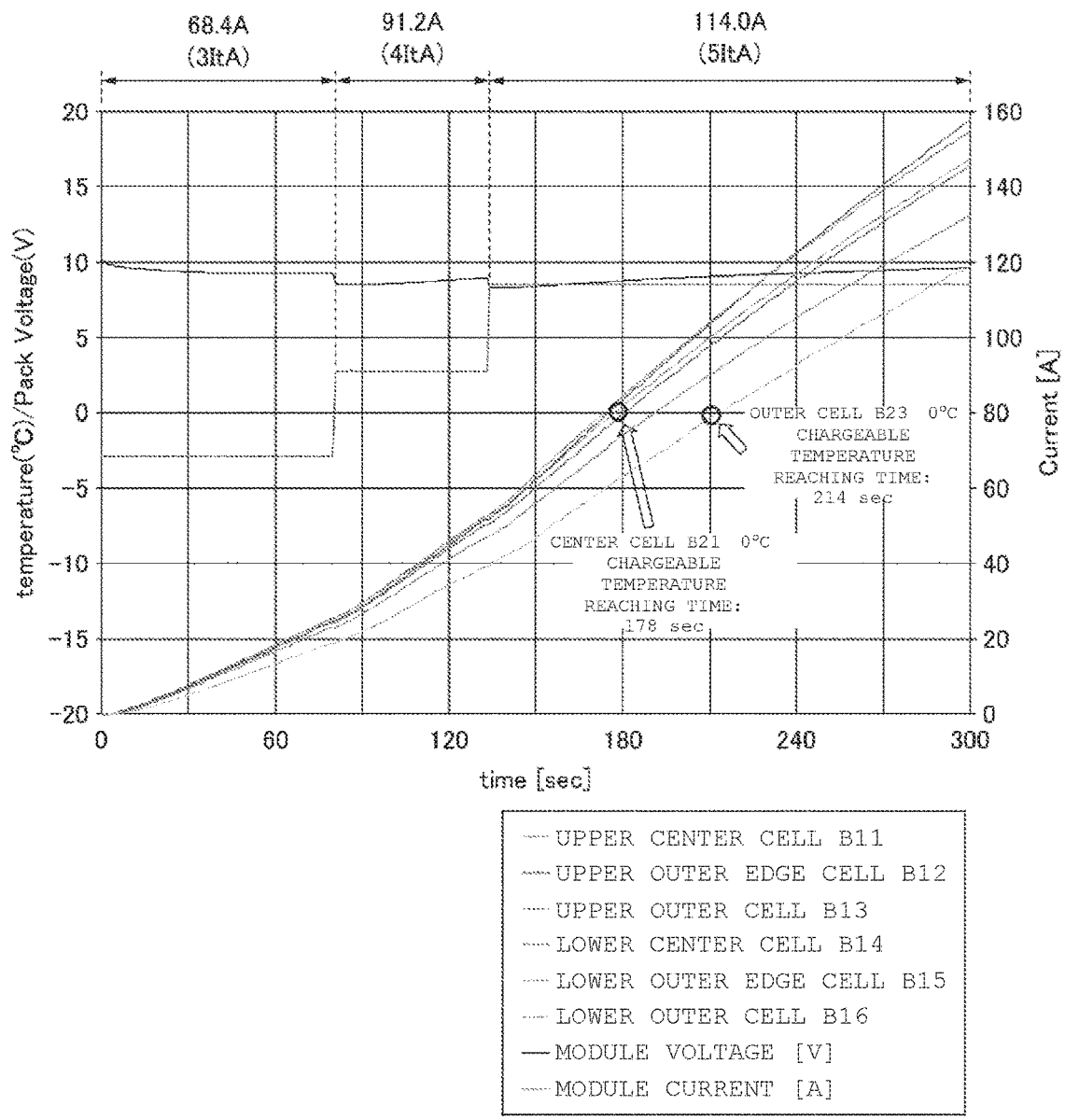
FIG. 11 is a graph for describing chargeable temperature reaching time according to an embodiment of the present technology.

As the cells to be subjected to temperature measurement, in the upper battery module BM1, a center cell B11, an outer edge cell B12, and an outer cell B13 are used, and in the lower battery module BM2, a center cell B21, an outer edge cell B22, and an outer cell B23 are used. FIG. 11 shows the temperature measurement results when the cells are warmed up by variable current discharge control as in the first embodiment. In the variable current discharge control, a charge current is changed in the three steps: 68.4 A (3 ItA)→91.2 A (4 ItA)→114.0 A (5 ItA).

The lower center cell B21 takes 178 seconds to reach the chargeable temperature (0° C.). On the other hand, the lower outer cell B23 takes 214 seconds. Since there is a bus bar nearby and the heat of the bus bar is transferred, temperature rise of the outer edge cells B12 and B22 is higher than that of the center cells B11 and B21. Since the outer cells B13 and B23 are in contact with the air, the outer cells B13 and B23 are less prone to being warmed.

Thus, in the case of a large battery module, the volume of the battery module is large, and even if the battery module is warmed up, a temperature difference occurs in the battery module, so that the outer cell is less prone to being warmed. Thus, even when the inside of the battery module reaches the chargeable temperature, the outside of the battery module may not yet reach the chargeable temperature, and it takes time for all the cells to reach the chargeable temperature.

Hereinafter, control processing of the third embodiment of the present invention will be described with reference to the flowchart of FIG. 12. In this processing, from the charge prohibition state, discharge is performed from a cell with the most remaining capacitance by a passive method of cell balance correction (a method of discharging with a resistor and aligning cell voltage). This is processing for passing the discharged current through a heater and, while correcting cell balance, warming up a cell that is less prone to being warmed earlier. When the discharge of the cell balance correction is terminated, the entire battery module is brought to not less than 0° C. by the variable current discharge control adopted in the first or second embodiment. For ease of understanding of the control processing, in the flowchart of FIG. 12, the processing is performed assuming an in-vehicle battery module having one parallel (n=20 series) and a nominal capacitance of 20 Ah. The present technology can also be applied to other battery modules.

First, in step S21, the battery temperature is detected, and in step S22, it is confirmed whether the battery temperature is the charging prohibition temperature and dischargeable temperature. That is, it is determined whether a relation of (−20° C.<X° C.<0° C.) is satisfied. When this condition is not satisfied, that is, when the battery temperature is the chargeable temperature (not less than 0° C.), only the cell balance correction is executed in step S23, and the processing is terminated.

When the determination result in step S22 is Yes, that is, when the battery temperature is the charging prohibition temperature and the dischargeable temperature, each cell voltage and each cell capacitance are confirmed in step S24, and in step S25, it is determined whether 19 cells have been already subjected to the cell balance correction.

When it is determined that the 19 cells have not yet been subjected to the cell balance correction, the cell to be subjected to the cell balance correction is judged in step S26. Then, in step S27, the cell balance correction is executed to discharge a place that is less prone to being warmed by a passive method of the cell balance correction, using a cell with the most remaining capacitance. The discharged current is passed through a heater, and the cell is warmed up while the cell balance is corrected. Returning to step S25, it is confirmed whether the 19 cells have been already subjected to the cell balance correction.

In step S25, when the cell balance correction has not yet been performed on all the cells, the cell to be subjected to the cell balance correction is judged again in step S26. Since the cell balance correction has already been performed once, a cell with the second most remaining capacitance is discharged, and the cell is warmed up by two cell balance corrections. Subsequently, steps S25→S26→S27 are repeated and executed until the number of times to warm up the cell with a heater in the cell balance correction reaches 1→2→3→ . . . →19. Since the 20 cells are connected in series here, assuming that the lowest cell voltage is a reference of a cell balance discharge end voltage, it is necessary to perform the cell balance correction on 19 cells (20 cells connected in series—one reference cell).

In step S25, when it is determined that the 19 cells have been already subjected to the cell balance correction, since the cell balance correction is terminated, the cell balance correction is stopped in step S28.

In step S29, the entire module is discharged, and the entire module is warmed up. In step S30, it is determined whether a relation of (0° C.<X° C.) is satisfied. When it is confirmed in step S30 that the temperature of the entire module has reached the chargeable temperature higher than 0° C., discharge is stopped in step S31. Steps S29, S30 and S31 are processing for performing the variable current discharge control described in the first or second embodiment.

Since the number of cells increases as the number of series increases, variation in cell capacitance increases. Thus, when charge and discharge are repeated, variation of the voltage of each cell becomes larger as compared with the battery module having a small number of series. Thus, the cell balance correction of a large battery module is indispensable.

Figure 12:
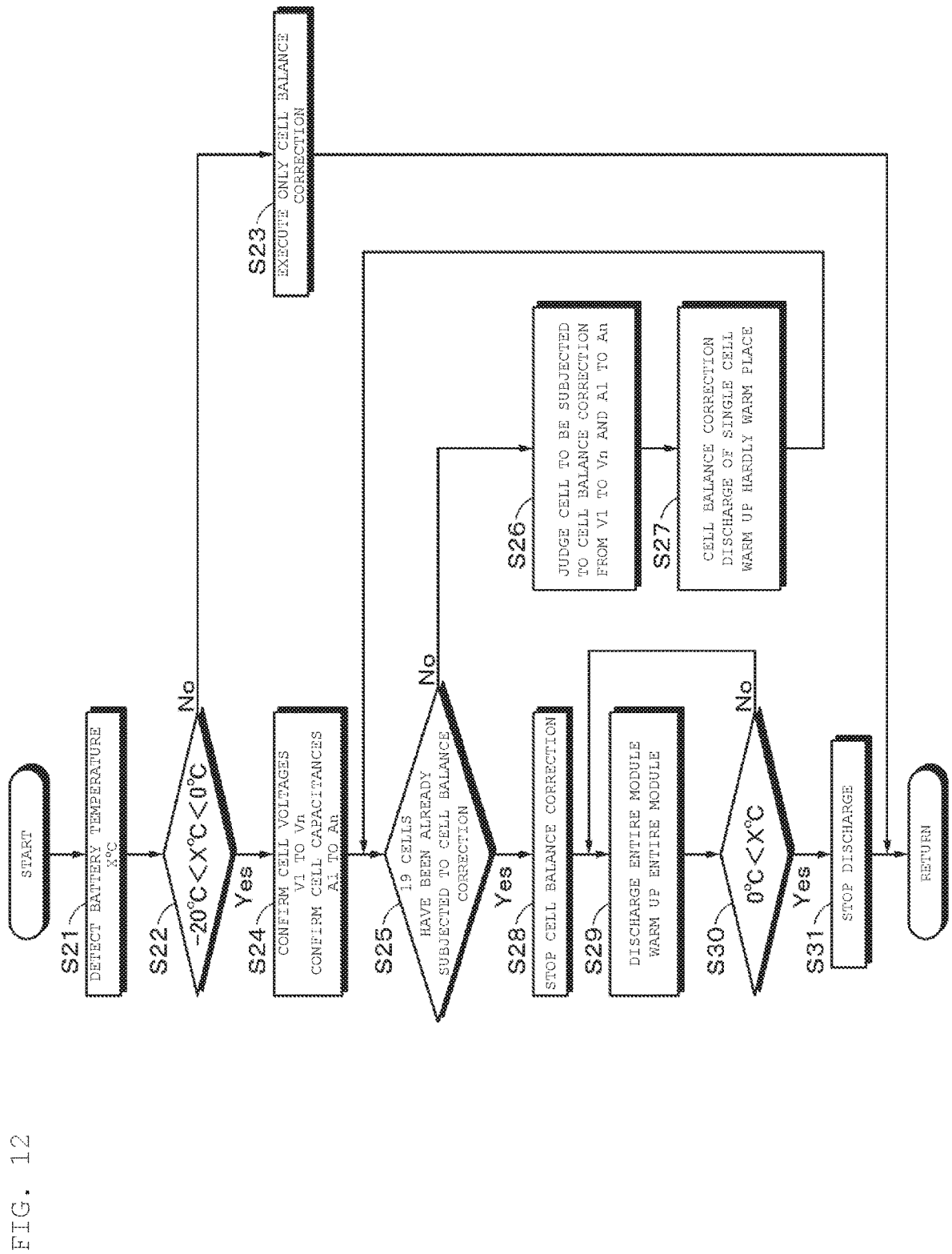
FIG. 12 is a flowchart showing a flow chart of processing according to an embodiment of the present technology.

Taking as an example an in-vehicle battery module having one parallel and 20 series and a nominal capacitance of 20 Ah for describing the flowchart shown in FIG. 12, since the number of series is as very large as 20 series, as shown in Table 2, a difference between a maximum capacitance and a minimum capacitance is 0.29 Ah (1.5%), and the capacitance of the cell varies. In Table 2, with reference to the cell with the smallest capacitance (No. 2), the remaining capacitance of other cells is shown.

TABLE 2

| Cell No. | Remaining capacitance [Ah] |
|---|---|
| 1 | 0.07 |
| 2 | 0.00 |
| 3 | 0.06 |
| 4 | 0.00 |
| 5 | 0.16 |
| 6 | 0.02 |
| 7 | 0 21 |
| 8 | 0.29 |
| 9 | 0.14 |
| 10 | 0.12 |
| 11 | 0.12 |
| 12 | 0.16 |
| 13 | 0.21 |
| 14 | 0 13 |
| 15 | 0.11 |
| 16 | 0.12 |
| 17 | 0.19 |
| 18 | 0.09 |
| 19 | 0.06 |
| 20 | 0.09 |
| Ave | 0.12 |
| Max | 0.29 |

The cell balance correction method includes a "passive method" and an "active method". In the passive method, since a cell to be discharged is discharged through a resistor to correct the cell balance, the circuit system is simple but surplus discharge capacitance is forcibly discharged. In the active method, surplus discharge capacitance of a certain cell is equalized by being transferred to another battery cell. However, since the system becomes complicated, the cost rises, and the capacitance cannot be transferred to another battery cell by 100%. According to the present technology, it is possible to use the cell balance correction using either method. In the present technology, in case of low temperature, discharge capacitance generated by the cell balance correction is effectively utilized. That is, utilizing the discharge capacitance, a cell which is less prone to being warmed and is likely to be cooled is warmed up with a heater.

Figure 13:
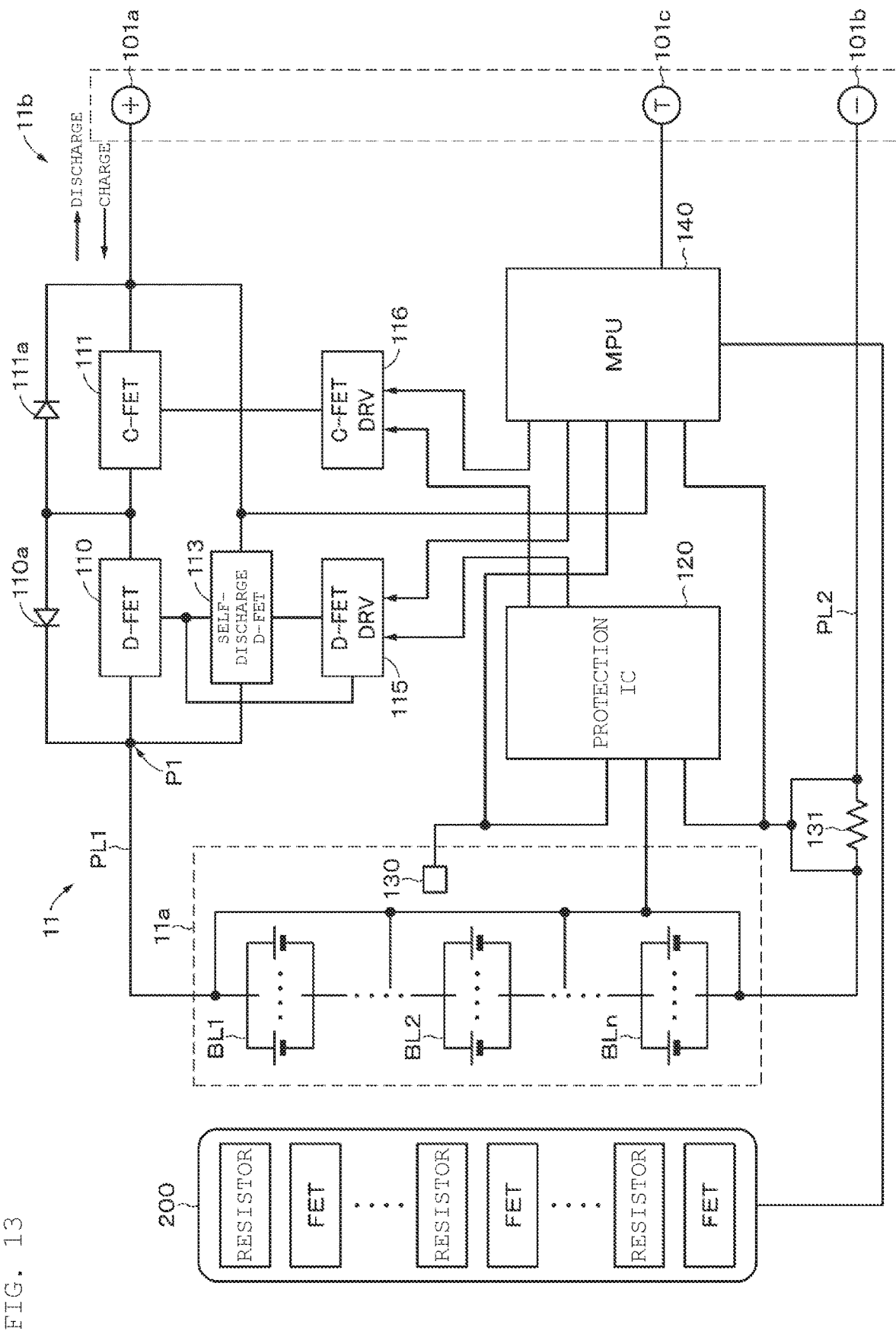
FIG. 13 is a block diagram showing a schematic configuration according to an embodiment of the present technology.

In the third embodiment, for example, as shown in FIG. 13 in the first embodiment described above, a cell balance correction circuit 200 is added. The cell balance correction circuit 200 includes a usual cell balance correction circuit and a heater cell balance correction circuit. The reason for thus providing the two cell balance correction circuits is to prevent the heater from operating to deteriorate the battery module 11a even at high environment temperature. The third embodiment may be combined with the second embodiment.

For easy understanding of the system, it is assumed that the battery module 11a has a configuration in which three-stage battery blocks BL1, BL2 and BL3 are connected in series. An explanation will be given assuming two conditions where the upper battery block BL1 is less prone to being warmed and here only the middle battery block BL2 has high discharge capacitance and requires the cell balance correction. Accordingly, heaters (heater resistors R11, R12, and R13) are provided for the battery block BL1.

Figure 14:
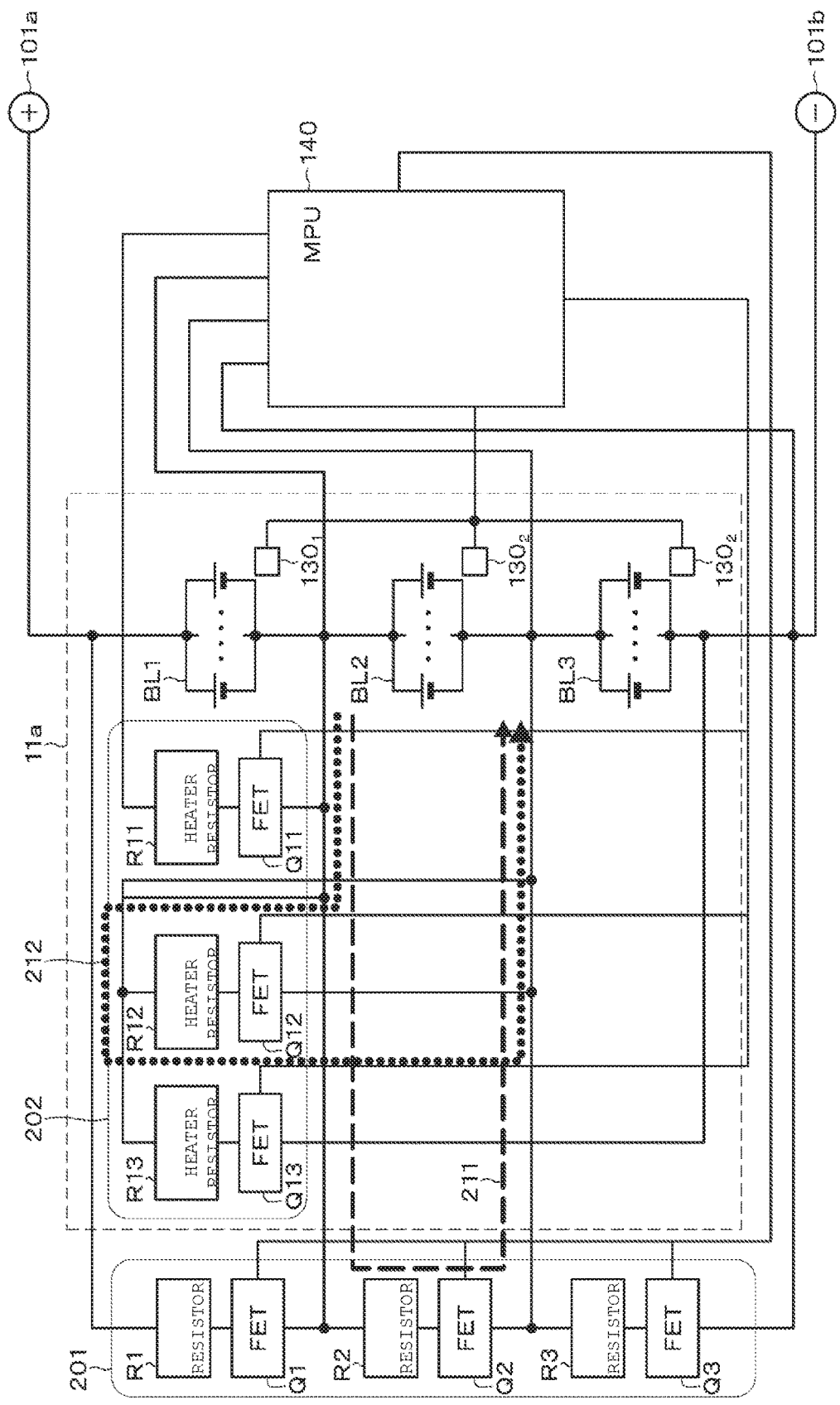
FIG. 14 is a block diagram showing a configuration according to an embodiment of the present technology.

As shown in FIG. 14, series circuits of resisters R1, R2, and R3 and FETs Q1, Q2, and Q3 of the usual cell balance correction circuit 201 and series circuits of the heater resisters R11, R12, and R13 and FETs Q11, Q12, and Q13 of the heater cell balance correction circuit 202 are connected in parallel to each battery block.

When the middle battery block BL2 has high discharge capacitance, as indicated by a dotted current path 211, the FET Q2 is turned on, and the battery block BL2 is discharged through the resistor R2. Alternatively, as indicated by a current path 212, the FET Q12 is turned on, and the battery block BL2 is discharged through the heater resistor R12. As current flows through the heater resistor R12, the heater resistor R2 generates heat, and the battery block BL2 is warmed up.

The temperature of each battery block is detected by temperature sensors $130_1$, $130_2$, and $130_3$ such as thermistors or thermocouples, and the detection result is supplied to the MPU 140. The MPU 140 can control ON/OFF of the six FETs Q1 to Q13 separately. The MPU 140 receives voltage values of the respective battery blocks BL1, BL2, and BL3. The MPU 140 controls each element so as to perform the processing of the third embodiment described with reference to the flowchart of FIG. 12.

A usual cell balance processing of the third embodiment will be described. First, it is confirmed whether the temperature of each battery block is higher than the chargeable temperature (0° C.). Then, after the voltage and capacitance of each battery block are confirmed, the FET Q2 which controls usual cell balance correction is turned on to consume the capacitance at the discharge route of the dotted line 211 and thus to adjust the cell balance.

At low temperature, it is confirmed whether the temperature of each battery block is not more than the charging prohibition temperature and is the dischargeable temperature. When the temperature of each battery block is not more than the charging prohibition temperature and is the dischargeable temperature, after the voltage and capacitance of each cell are confirmed, the FET Q12 controlling the cell balance at low temperature is turned on to consume the capacitance at the discharge route of the dotted line 212 and thus to adjust the cell balance, and the battery block BL2 that is less prone to being warmed is warmed up due to heat generation of the heater resistor R12.

According to the third embodiment described above, the capacitance of a wasteful cell in the cell balance correction is utilized, and the cell which is less prone to being warmed and is likely to be cooled is warmed up earlier; therefore, it is possible to shorten the time from the charging prohibition temperature to the chargeable temperature. Further, it is possible to effectively utilize the discharge capacitance used in the cell balance correction. Further, since the cell is warmed up with a heater without using a heat transfer member, there is no remarkable weight increase, and a simple configuration can be achieved. Furthermore, when the circuit system is a simple passive type cell balance correction circuit, it suffices to slightly change the configuration, so that the circuit system can be simpler than the active type.

Next, an application example of the present technology will be described.

Figure 15:
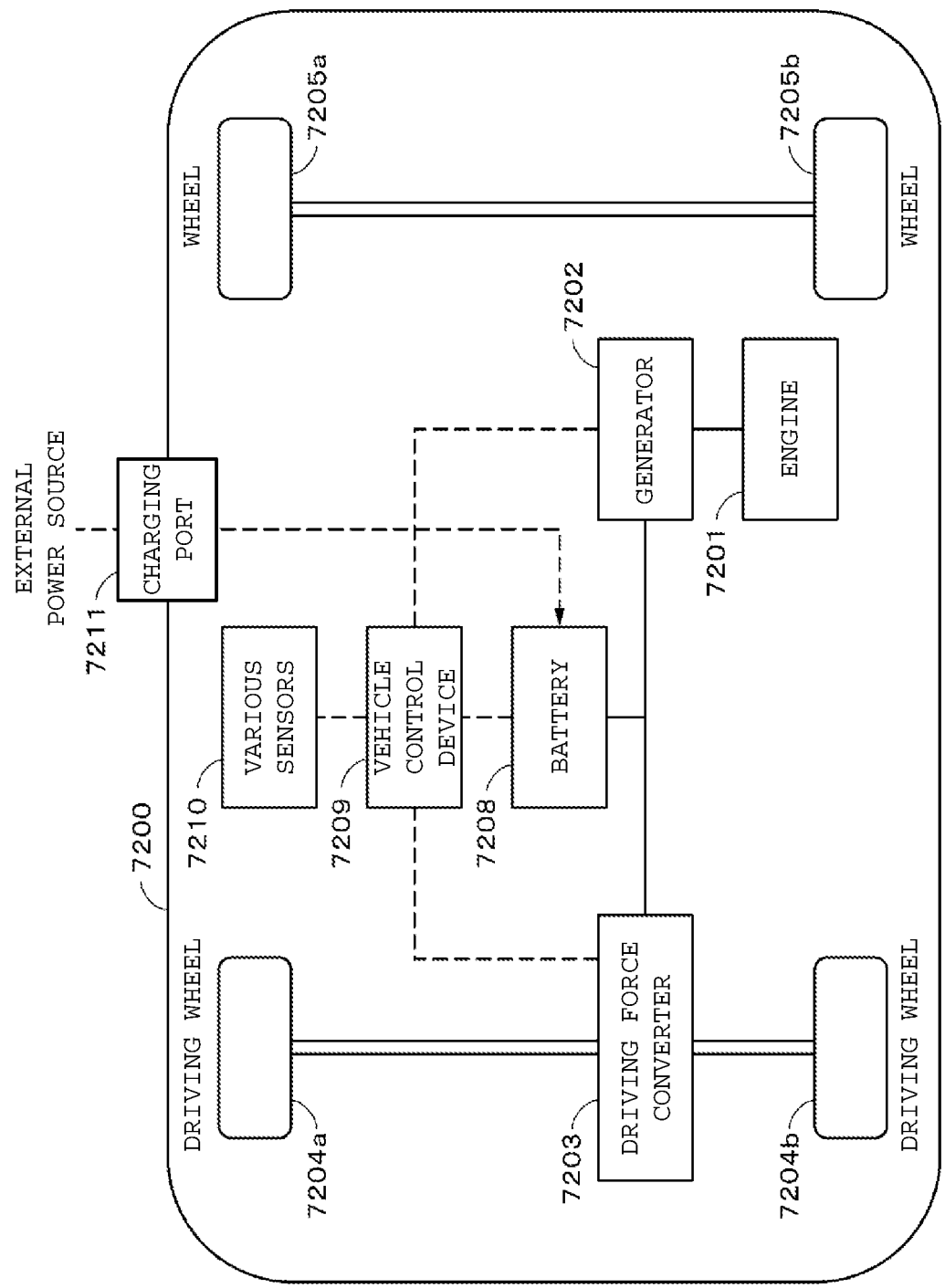
FIG. 15 is a diagram for describing an application example according to an embodiment of the present technology.

An example in which the present technology is applied to a power storage system for a vehicle will be described with reference to FIG. 15. FIG. 15 schematically shows an example of a configuration of a hybrid vehicle employing a series hybrid system to which the present technology is applied. The series hybrid system is a car travelling with an electric power driving force converter using electric power generated by a generator driven by an engine or electric power obtained by temporarily storing the generated electric power in a battery.

An engine 7201, a generator 7202, an electric power driving force converter 7203, a driving wheel 7204a, a driving wheel 7204b, a wheel 7205a, a wheel 7205b, a battery 7208, a vehicle control device 7209, various sensors 7210, and a charging port 7211 are mounted in a hybrid vehicle 7200. The above-described power storage device of the present technology is applied to the battery 7208.

The hybrid vehicle 7200 travels using the electric power driving force converter 7203 as a power source. An example of the electric power driving force converter 7203 is a motor. The electric power driving force converter 7203 acts by electric power of the battery 7208, and a rotating force of the electric power driving force converter 7203 is transmitted to the driving wheels 7204a and 7204b. The electric power driving force converter 7203 can be applied to both an AC motor and a DC motor by using DC-AC conversion or reverse conversion (AC-DC conversion) at necessary portions. The various sensors 7210 control an engine speed through the vehicle control device 7209, or control an opening degree (throttle opening degree) of a throttle valve (not shown). The various sensors 7210 include a velocity sensor, an acceleration sensor, an engine speed sensor, and the like.

A rotating force of the engine 7201 is transmitted to the generator 7202, and electric power generated by the generator 7202 can be stored in the battery 7208 by the rotating force.

When the hybrid vehicle is decelerated by a brake mechanism (not shown), a resistance force during the deceleration is added to the electric power driving force converter 7203 as a rotating force, and regenerative electric power generated by the electric power driving force converter 7203 due to this rotating force is stored in the battery 7208.

By being connected to an external power source of the hybrid vehicle, the battery 7208 receives electric power from the external power source by using the charging port 7211 as an input port, and can store the received electric power.

Although not shown, an information processing device for performing information processing relating to vehicle control based on information on a secondary battery may be included. An example of such an information processing device includes an information processing device for displaying a battery remaining amount based on information about the battery remaining amount.

The above description has been made by exemplifying a series hybrid car travelling with a motor using electric power generated by a generator driven by an engine or electric power obtained by temporarily storing the generated electric power in a battery. However, the present technology can also be applied effectively to a parallel hybrid car which uses the output of an engine and a motor as the driving force source and switches three modes as appropriate: driving with the engine only; driving with the motor only; and driving with the engine and the motor. In addition, the present technology can also be applied effectively to a so-called electric vehicle travelling by driving only with a driving motor without use of an engine.

An example of the hybrid vehicle 7200 to which the technology according to the present technology can be applied has been described above. The technology according to the present technology can be suitably applied to, for example, the vehicle control device 7209 and the battery 7208 among the above-described configurations. Specifically, the battery module 11a is applied to the battery 7208, and the functions of the ECU 11b and the display 11c are applied as a function of the vehicle control device 7209.

Figure 16:
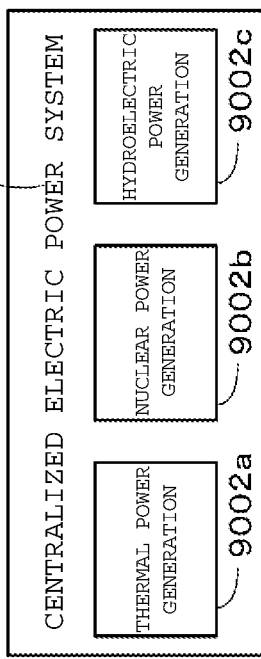
FIG. 16 is a diagram for describing another application example according to an embodiment of the present technology.
Figure 16:
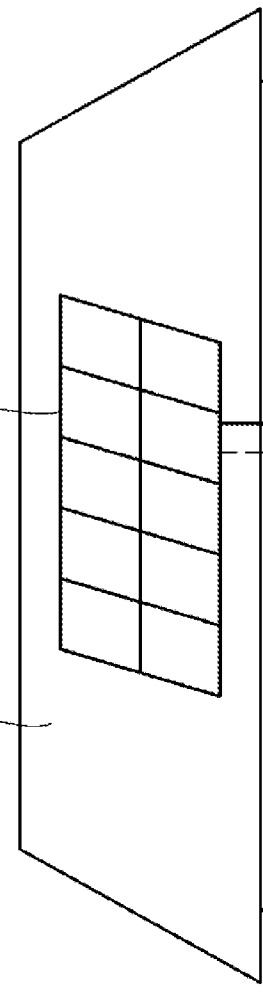
Figure 16:
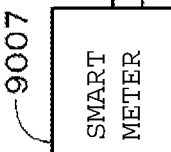
Figure 16:
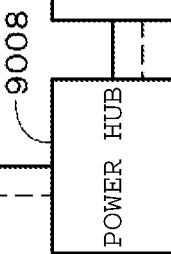

An example in which the present technology is applied to a power storage system for a house will be described referring to FIG. 16. For example, in a power storage system 9100 for a house 9001, electric power is supplied from a centralized electric power system 9002 such as thermal power generation 9002*a*, nuclear power generation 9002*b*, or hydroelectric power generation 9002*c* to a power storage device 9003 via an electric power network 9009, an information network 9012, a smart meter 9007, a power hub 9008, or the like. At the same time, electric power is supplied from an independent power source such as a home power generating device 9004 to the power storage device 9003. The electric power supplied to the power storage device 9003 is stored. Electric power used in the house 9001 is supplied using the power storage device 9003. Not only the house 9001 but also a building can use a similar power storage system.

The house 9001 is provided with the power generating device 9004, an electric power consumption device 9005, the power storage device 9003, a control device 9010 for controlling devices, the smart meter 9007, and a sensor 9011 for acquiring various information. The devices are connected to each other via the electric power network 9009 and the information network 9012. As the power generating device 9004, a solar cell, a fuel cell, or the like is used, and generated electric power is supplied to the electric power consumption device 9005 and/or the power storage device 9003. The electric power consumption device 9005 is a refrigerator 9005*a*, an air conditioner 9005*b*, a television receiver 9005*c*, a bath 9005*d*, or the like. Furthermore, the electric power consumption device 9005 further includes an electric vehicle 9006. The electric vehicle 9006 is an electric car 9006*a*, a hybrid car 9006*b*, an electric motorcycle 9006*c*, or the like.

The above-described battery unit of the present technology is applied to the power storage device 9003. The power storage device 9003 is constituted by a secondary battery or a capacitor. For example, the power storage device 9003 is constituted by a lithium ion battery. The lithium ion battery may be a stationary type or may be used in the electric vehicle 9006. The smart meter 9007 has a function of measuring a use amount of commercial electric power, and transmitting the measured use amount to an electric power company. The electric power network 9009 may be any one of DC power supply, AC power supply, and non-contact power supply, or a combination of two or more of these.

Examples of the various sensors 9011 include a human sensor, an illuminance sensor, an object detection sensor, a consumed electric power sensor, a vibration sensor, a contact sensor, a temperature sensor, and an infrared sensor. Information acquired by the various sensors 9011 is transmitted to the control device 9010. With the information from the sensors 9011, weather conditions, human conditions, and the like are grasped, and the electric power consumption device 9005 is automatically controlled so as to minimize energy consumption. Furthermore, the control device 9010 can transmit information on the house 9001 to an external electric power company or the like via internet.

The power hub 9008 performs processing such as branching of an electric power line or DC-AC conversion. A communication method of the information network 9012 connected to the control device 9010 includes a method of using a communication interface such as universal asynchronous receiver-transmitter (UART): asynchronous serial communication transmitter/receiver circuit) and a method of using a sensor network by a wireless communication standard, such as Bluetooth (registered trademark), ZigBee, or Wi-Fi. The Bluetooth (registered trademark) method is applied to multimedia communication and can perform one-to-many communication. ZigBee uses a physical layer of institute of electrical and electronics engineers (IEEE) 802.15.4. IEEE 802.15.4 is a name of a short-distance wireless network standard called personal area network (PAN) or wireless (W) PAN.

The control device 9010 is connected to an external server 9013. This server 9013 may be managed by any one of the house 9001, an electric power company, and a service provider. For example, information transmitted or received by the server 9013 is consumption electric power information, life pattern information, electric power charge, weather information, natural disaster information, or information about electric power transaction. Although a home electric power consumption device (for example, a television receiver) may transmit or receive the above information, an outside-home device (for example, a mobile phone) may transmit or receive the information. A device having a display function, such as a television receiver, a mobile phone, or personal digital assistants (PDA) may display the information.

The control device 9010 for controlling units is formed by a central processing unit (CPU), a random access memory (RAM), a read only memory (ROM), and the like, and is housed in the power storage device 9003 in this example. The control device 9010 is connected to the power storage device 9003, the home power generating device 9004, the electric power consumption device 9005, the various sensors 9011, and the server 9013 via the information network 9012, and for example, has a function of adjusting a use amount of commercial electric power and a power generation amount. In addition, the control device 9010 may have a function of performing electric power transaction in an electric power market.

As described above, the power storage device 9003 can store not only electric power from the centralized electric power system 9002 such as the thermal power generation 9002*a*, the nuclear power generation 9002*b*, or the hydroelectric power generation 9002*c* but also electric power generated by the home power generating device 9004 (solar power generation or wind power generation). Accordingly, even when the electric power generated by the home power generating device 9004 fluctuates, a control to keep the amount of electric power to be sent to an outside constant or to discharge by a necessary amount of electric power can be performed. For example, the following method of use is possible. That is, electric power obtained by solar power generation is stored in the power storage device 9003, midnight electric power the charge of which is low at night is stored in the power storage device 9003, and electric power stored in the power storage device 9003 is used by discharging in daytime in which electric power charge is high.

In this example, the control device 9010 housed in the power storage device 9003 has been exemplified, but the control device 9010 may be housed in the smart meter 9007, or may be formed alone. Furthermore, the power storage system 9100 may be used for a plurality of homes in a multiple dwelling house or a plurality of detached houses.

An example of the power storage system 9100 to which the technology according to the present technology can be applied has been described above. The technology according to the present technology can be suitably applied to the power storage device 9003 among the above-described configurations. Specifically, the battery device 11 can be applied to the power storage device 9003.

The present technology is also applicable to aircraft. Since the aircraft flies at high altitude, the operating environment temperature of the battery module can be not more than 0° C. Even in such a case, the case can be dealt with by performing the above-described variable current discharge control. The present technology is applicable not only to large-sized electric vehicles and aircraft, but also to electric motorcycles, electric bicycles, electric tricycles, electric compact flying bodies (also called drones etc.), and the like.

The present technology is applicable to electronic devices (such as PCs, smart phones, mobile phones, electric tools, and toys) in which a secondary battery can be used, and it is also possible to realize the present technology as an electronic device receiving power supply from the above-described battery device.

Instead of or in addition to the display, the user may be notified that the variable current discharge control is being performed by sound or the like. Another device may be notified by communication that the variable current discharge control has been performed.

The processing described with reference to the flowchart of FIG. 3 may be changed as appropriate. For example, the judgement in step S14 may be performed not only at the timing when the discharge current value is switched but also periodically during discharge. When the voltage of the battery module falls below the discharge end voltage at the timing of switching the discharge current value, processing for reducing the discharge current value or returning to the discharge current value before switching may be added. It is not necessary that all of the processing described with reference to the flowchart of FIG. 3 correspond to the variable current discharge control.

Switching of the discharge current value in the variable current discharge control is not limited to the stepwise manner, and a control to linearly increase the discharge current value may be performed, for example.

The embodiments of the present technology have been specifically described above; however, the present technology is not limited to the above-described embodiments. Various modifications of the present technology can be made based on the technical spirit of the present technology. For example, the configurations, the methods, the processes, the shapes, the materials, the numerical values, and the like mentioned in the above-described embodiments are merely examples. Different configurations, methods, processes, shapes, materials, numerical values, and the like may be used as necessary.

The present technology is described below in further detail according to an embodiment (1)

A battery device including a temperature detector that detects a temperature of a battery and a control unit that performs variable current discharge on a secondary battery when the temperature detector detects a constant temperature range immediately before a start of charge.

(2)

The battery device according to (1), in which the constant temperature range is from −20° C. to 0° C.

(3)

The battery device according to (1) or (2), further including an assembled battery in which a plurality of battery cells are connected in series and/or in parallel and assembled in close proximity to each other, a switch element for balance correction connected to each of the battery cells of the assembled battery, and a plurality of heating elements to which a current flowing through the switch element is supplied, in which the plurality of heating elements are arranged in contact with or near a battery cell of the assembled battery, the battery cell being less prone to being warmed, and when the temperature detector detects the constant temperature range, after balance correction is performed, the assembled battery is discharged so that a chargeable temperature is reached.

(4)

The battery device according to any of (1) to (3), further including an assembled battery in which a plurality of secondary batteries are connected in series and/or in parallel and assembled in close proximity to each other, a first balance correction circuit having a switch element for balance correction connected to each of the secondary batteries of the assembled battery and a plurality of resistors to which a current flowing through the switch element is supplied, and a second balance correction circuit having a switch element for balance correction connected to each of the secondary batteries of the assembled battery and a plurality of heater resistors to which a current flowing through the switch element is supplied, in which the plurality of heater resistors are arranged in contact with or near a secondary battery of the assembled battery, the secondary battery being less prone to being warmed, balance correction is performed by the first balance correction circuit at a chargeable temperature, and after balance correction is performed by the second balance correction circuit at a dischargeable and non-chargeable temperature, a variable current discharge control is performed on the secondary battery.

(5)

The battery device according to any of (1) to (4), in which the variable current discharge control is a control to discharge the secondary battery with different discharge current values according to a temperature of the secondary battery.

(6)

The battery device according to (5), in which the variable current discharge control is a control to increase each of the discharge current values and discharge the secondary battery as the temperature of the secondary battery rises.

(7)

The battery device according to any of (1) to (6), in which the control unit is configured to stop the variable current discharge control when a voltage of the secondary battery falls below a discharge end voltage.

(8)

The battery device according to any of (1) to (7), in which the control unit is configured to judge whether to perform the variable current discharge control according to state of charge (SOC) of the secondary battery.

(9)

The battery device according to any of (1) to (8), further including a power storage that stores electric power outputted from the secondary battery in response to the variable current discharge control.

(10)

The battery device according to any of (1) to (9), in which a heater is connected as a load of the secondary battery.

(11)

An electronic device receiving supply of electric power from the battery device according to (1).

(12)

An electric vehicle including the battery device according to (1).

(13)

A power storage system including the battery device according to (1).

(14) A control method including, by a control unit, at a dischargeable and non-chargeable temperature, performing a variable current discharge control to increase a discharge current value and discharge a secondary battery as a temperature of the secondary battery rises.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery device, comprising:
a temperature detector configured to detect a temperature of a battery;
a controller configured to perform variable current discharge on the battery when the temperature detector detects a constant temperature range immediately before a start of charge,
wherein the battery includes a plurality of secondary batteries that are connected and assembled in proximity to each other;
a first balance correction circuit including a first switch configured to perform balance correction and connected to each of the secondary batteries and a plurality of resistors to which a current flowing through the first switch is supplied; and
a second balance correction circuit including a second switch configured to perform balance correction and connected to each of the secondary batteries and a plurality of heater resistors to which a current flowing through the second switch is supplied,
wherein the plurality of heater resistors are arranged in contact with or near one or more of the secondary batteries,
wherein balance correction is performed by the first balance correction circuit at a chargeable temperature, and
wherein after balance correction is performed by the second balance correction circuit at a dischargeable and non-chargeable temperature, a variable current discharge control is performed on the battery.

2. The battery device according to claim 1, wherein the constant temperature range is from −20° C. to 0° C.

3. The battery device according to claim 1,
wherein the battery includes a plurality of battery cells including one or more of the secondary batteries and that are connected and assembled in proximity to each other;
a switch configured to perform balance correction, and connected to each of the battery cells of the battery; and
a plurality of heaters to which a current flowing through the switch is supplied,
wherein the plurality of heaters are arranged in contact with or near one or more of the battery cells, and
wherein the battery is discharged to reach the chargeable temperature after balance correction is performed when the temperature detector detects the constant temperature range.

4. The battery device according to claim 1, wherein the variable current discharge control includes a control to discharge the battery with different discharge current values according to the temperature of the battery.

5. The battery device according to claim 4, wherein the variable current discharge control includes a control to increase each of the discharge current values and discharge the battery as the temperature of the battery rises.

6. The battery device according to claim 1, wherein the controller is configured to stop the variable current discharge control when a voltage of the battery falls below a discharge end voltage.

7. The battery device according to claim 1, wherein the controller is configured to determine whether to perform the variable current discharge control according to state of charge (SOC) of the battery.

8. The battery device according to claim 1, further comprising a power storage configured to store electric power outputted from the battery in response to the variable current discharge control.

9. The battery device according to claim 1, further comprising a plurality of battery cells including one or more of the secondary batteries, wherein the battery cells are connected in series.

10. The battery device according to claim 1, further comprising a plurality of battery cells including one or more of the secondary batteries, wherein the battery cells are connected in parallel.

11. The battery device according to claim 1, wherein a heater is connected as a load of the battery.

12. An electronic device receiving supply of electric power from the battery device according to claim 1.

13. An electric vehicle comprising the battery device according to claim 1.

14. A power storage system comprising the battery device according to claim 1.

15. A control method comprising, by a controller,
performing a variable current discharge control to increase a discharge current value and discharge a battery as a temperature of the battery rises at a dischargeable and non-chargeable temperature, wherein the battery includes a plurality of secondary batteries that are connected and assembled in proximity to each other;
providing a first balance correction circuit including a first switch configured to perform balance correction and connected to each of the secondary batteries and a plurality of resistors to which a current flowing through the first switch is supplied; and
providing a second balance correction circuit including a second switch configured to perform balance correction and connected to each of the secondary batteries and a plurality of heater resistors to which a current flowing through the second switch is supplied,
wherein the plurality of heater resistors are arranged in contact with or near one or more of the secondary batteries,
wherein balance correction is performed by the first balance correction circuit at a chargeable temperature, and
wherein after balance correction is performed by the second balance correction circuit at a dischargeable and non-chargeable temperature, a variable current discharge control is performed on the battery.

* * * * *